(12) United States Patent
Sily

(10) Patent No.: US 12,442,442 B1
(45) Date of Patent: *Oct. 14, 2025

(54) ELASTOMERICALLY DAMPED GEAR WITH COAXIAL SELF ALIGNMENT

(71) Applicant: PRINCE MOHAMMAD BIN FAHD UNIVERSITY, Dhahran (SA)

(72) Inventor: Omar Dawood Mohammed Sily, Dhahran (SA)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/189,979

(22) Filed: Apr. 25, 2025

(51) Int. Cl.
*F16H 55/18* (2006.01)

(52) U.S. Cl.
CPC .................................... *F16H 55/18* (2013.01)

(58) Field of Classification Search
CPC .......... F16H 55/18; F16H 55/14; F16H 55/17; F16H 1/26; F16H 55/06; F16H 2055/176; F16H 2055/185
See application file for complete search history.

(56) References Cited

U.S. PATENT DOCUMENTS

| 2008/0156574 A1 | 7/2008 | Otsuki |
| 2020/0309204 A1 | 10/2020 | Kiesewetter |
| 2021/0231204 A1* | 7/2021 | Morio ..................... F16H 55/17 |

FOREIGN PATENT DOCUMENTS

| GB | 2 224 805 A | 5/1990 |
| JP | 2020-020354 A | 2/2020 |

OTHER PUBLICATIONS

U.S. Appl. No. 19/190,192, filed Apr. 25, 2025, Sily.
U.S. Appl. No. 19/190,427, filed Apr. 25, 2025, Sily.
U.S. Appl. No. 19/098,676, filed Apr. 2, 2025, Sily.

* cited by examiner

*Primary Examiner* — Terence Boes
(74) *Attorney, Agent, or Firm* — Oblon, McClelland, Maier &Neustadt, L.L.P.

(57) ABSTRACT

A self-aligning gear includes a toothed ring gear having inner gear teeth alternating with inner grooves on an inner circumference and outer gear teeth on an outer circumference, a spline gear having spline teeth alternating with spline grooves on an outer circumference, wherein the spline teeth fit in the inner grooves of the toothed ring gear, and a curved-faces pin assembly including a cylindrical pin having semicircular ends and an elastomeric material pattern which conforms to the shape of the spline grooves and inner grooves. The grooves have either trapezoidal walls or semi-cylindrical walls. The self-aligning gear also includes a locking assembly with a flanged hub and threaded disc to secure the components. The elastomeric material provides alignment compensation through controlled deformation while maintaining torque transfer capability. The self-aligning gear compensates for misalignment in gear transmissions, extending operational life while maintaining power transmission efficiency.

12 Claims, 22 Drawing Sheets

300

Installing curved-faces pin assembly within corresponding groove, wherein curved-faces pin assembly includes cylindrical pin having semicircular ends and pattern of elastomeric material which conforms to shape of groove

*FIG. 21*

ELASTOMERICALLY DAMPED GEAR WITH COAXIAL SELF ALIGNMENT

BACKGROUND

Technical Field

An elastomerically damped gear is described. The present disclosure includes an elastomerically damped gear having a self-aligning gear that functions to eliminate or mitigate misalignment in transmissions. The elastomerically damped gear smoothly transfers torque, for example to a drive train.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gear transmissions are widely used in various mechanical systems to transfer rotational motion and power between shafts. These transmission systems typically include multiple gears arranged in specific configurations to achieve desired speed, torque, and directional modifications. Gear transmissions operate optimally when all components are perfectly aligned, maintaining precise contact patterns between meshing gear teeth. However, in practical applications, achieving and maintaining perfect alignment is exceedingly difficult due to various factors inherent in mechanical systems.

Gear transmissions frequently experience misalignment which can be attributed to transmission parts deflections, assembly errors, manufacturing tolerances, thermal expansion, bearing wear, shaft deflection under load, and dynamic operational factors. Misalignment significantly affects the load distribution on the gear tooth flank, altering the contact pattern as illustrated in comparative stress analyses. When misalignment occurs, contact stress becomes concentrated in the small areas between the gear teeth rather than being distributed across the intended contact surface. This concentration leads to substantially higher contact and bending stresses, particularly under high load conditions. The resulting stress concentration can initiate premature tooth fatigue, wear, pitting, spalling, and eventual catastrophic failure of gear components. In the design stage, misalignment imposes significant limitations on defining gear macro/micro-geometry and maximum acceptable load capacity, often requiring designers to implement substantial safety factors that reduce system efficiency or increase size and weight.

Conventional approaches to address gear misalignment include manufacturing gears with modified tooth profiles, implementing flexible couplings between shafts, utilizing self-aligning bearings, incorporating crowned gear teeth, and employing elastomeric materials at various interface points. These solutions attempt to accommodate misalignment by allowing limited movement or providing compliance at strategic locations in the gear train. For instance, crowned gear teeth have slightly convex profiles that maintain contact even when slight angular misalignment occurs. Similarly, flexible couplings permit angular movement between connected shafts while transmitting torque. Some references describe specific implementations of these approaches, including cushioning materials on gear teeth and elastomeric extensions on gear tooth sides.

JP2020020354A describes a gear structure including a gear having a spline hole in the center and a spline shaft inserted into the spline hole. Splines of the spline shaft have first and second tooth surfaces arranged pointing identically in the peripheral direction. A cushioning material is fixed to the first tooth surface abutting on a tooth surface of a spline of the spline hole. The cushioning material is nylon or rubber. The cushioning material covers the entire gear tooth, leaving a gap where the gear tooth of the outer gear meshes. However, this reference does not describe a gear assembly employing a combination of a ring gear, an engaging spline gear, and an intermediate element with a defined geometry and material composition designed for controlled compliance within the gear interfaces.

GB 2224805A describes a gear train anti-rattle device for a pair of meshing gears having backlash space therebetween comprising an elastomeric extension provided on at least one side of a gear having gear teeth adapted to mesh with a second gear. The elastomeric extension is formed of an elastomeric material having a low absorption coefficient and a high heat deflection temperature. However, this references do not describe a gear assembly employing a combination of a ring gear, an engaging spline gear, and an intermediate element with a defined geometry and material composition designed for controlled compliance within the gear interfaces.

Each of the aforementioned approaches suffers from one or more drawbacks hindering their adoption, such as limited misalignment compensation capacity, inadequate load-bearing capability during misalignment, excessive complexity leading to manufacturing challenges, lack of self-alignment functionality, and inability to handle both radial and axial forces simultaneously. Existing approaches provide compromises between misalignment accommodation and torque transfer capacity, leading to suboptimal performance in high-demand applications. Furthermore, existing solutions may increase backlash, generate additional noise, require frequent maintenance, or deteriorate rapidly under high temperature or high load conditions, making them unsuitable for many industrial applications.

Accordingly, it is an object of the present disclosure to provide a self-aligning gear and a method of correcting misalignment between a gear tooth and a corresponding groove of a self-aligning gear which effectively compensates for misalignment while maintaining high torque transfer capability and structural integrity under load conditions.

SUMMARY

In one aspect the present disclosure describes an elastomerically damped gear having a toothed ring gear with a plurality of inner gear teeth alternating with a plurality of inner grooves on an inner circumference and a plurality of outer gear teeth located on an outer circumference. A spline gear having an outer circumference comprising a plurality of spline teeth alternating with a plurality of spline grooves, wherein the spline teeth are configured to fit in the inner grooves of the toothed ring gear when the spline gear is assembled to the toothed ring gear. Each of the plurality of inner grooves and each of the plurality of spline grooves has trapezoidal walls, wherein a length of a base of each trapezoidal wall is less than a length of a top surface of the trapezoidal wall. A curved-faces pin assembly which includes a cylindrical pin having semicircular ends and a pattern of an elastomeric material which conforms to a shape of the spline grooves and the inner grooves wherein the pattern is a layer of the elastomeric material covering the trapezoidal walls and base.

In another embodiment, the elastomerically damped gear includes a locking assembly configured to lock the spline gear to the toothed ring gear, wherein the locking assembly includes a flanged hub and a threaded disc, wherein the flange of the hub is configured to face the spline gear and the toothed ring gear and the threaded disc is configured to engage with a set of inner threads of the spline gear and a set of inner threads of the toothed ring gear.

In another embodiment, the elastomerically damped gear includes a central opening in the spline gear, wherein the central opening is configured to receive a shaft.

In another embodiment, the length of the top surface of each trapezoidal wall is about 2 mm larger than a length of the base.

In another embodiment, the elastomerically damped gear the layer of the elastomeric material has a depth of about 3 mm.

In another embodiment, the elastomerically damped gear the cylindrical pin of the curved faces pin assembly is centrally located between the trapezoidal walls and parallel to the shaft, wherein the semicircular ends are configured to press fit into the layer of elastomeric material.

In another embodiment, the elastomerically damped gear each of the plurality of inner grooves and each of the plurality of spline grooves has semicylindrical walls, wherein a length of the cylindrical pin of each curved-faces assembly is equal to a length of each of the inner grooves and a length of each of the spline grooves measured along an axis from a back side of the spline gear to a front side of the spline gear and parallel to the shaft.

In another embodiment, the elastomerically damped gear the pattern comprises a layer of the elastomeric material which surrounds the cylindrical pin.

In another embodiment, the elastomerically damped gear includes a filler material, wherein the cylindrical pin of the curved faces pin assembly is centrally located within the semicylindrical walls of each of the plurality of inner grooves and each of the plurality of spline grooves and the filler material is configured to fill a gap between the curved faces pin assembly and the semicylindrical walls.

In another embodiment, the elastomerically damped gear the filler material has a Young's modulus less than or equal to 5 M Pa.

In another embodiment, the elastomerically damped gear the elastomeric material is rated for high temperature and pressure resistance.

In another embodiment, the elastomeric material has a Young's modulus in a range of about 5 M Pa to about 8 M Pa.

In another embodiment, the cylindrical pin is formed of an elastomeric material which has a Young's modulus in a range of about 50 M Pa to about 200 M Pa, a Shore A hardness in a range of about 20 to about 90, and a Shore D value in a range of about 30 to about 100.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 21 is an exemplary diagram showing a method of correcting misalignment between a gear tooth and a corresponding groove of a self-aligning gear assembly, according to certain embodiments.

DETAILED DESCRIPTION

Figure 1:
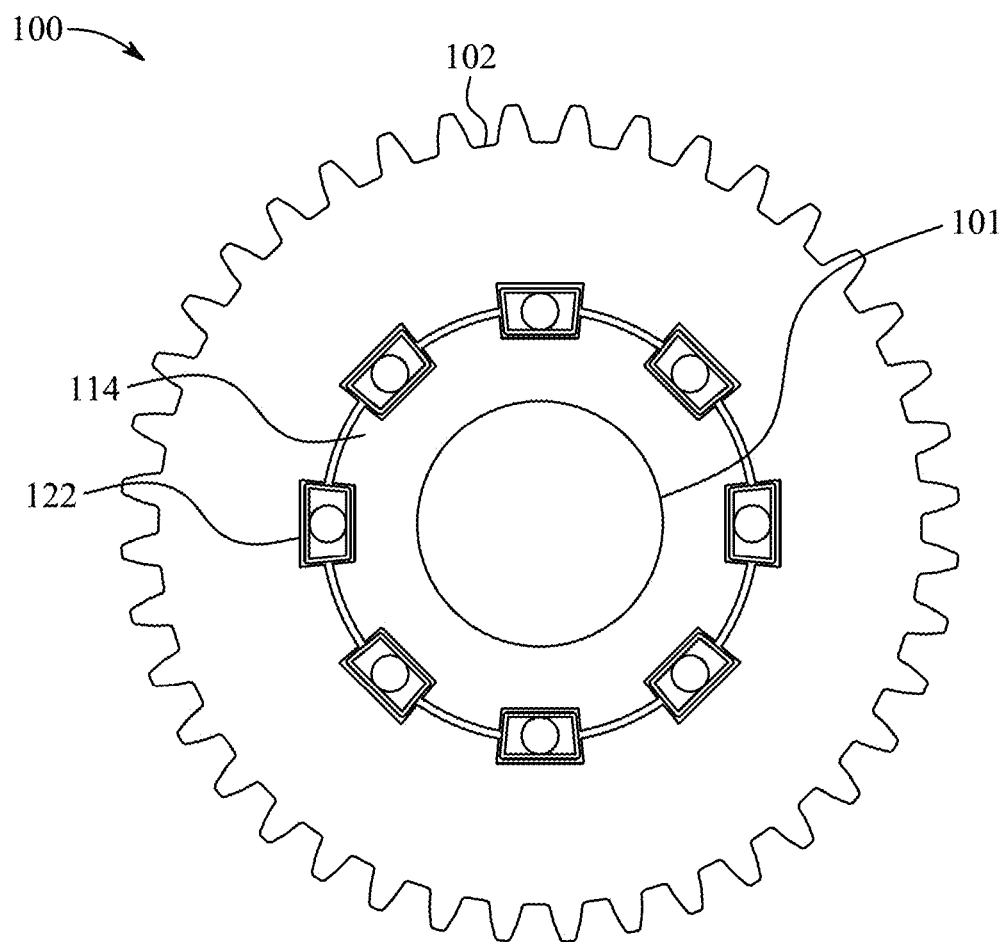
FIG. 1 is an exemplary diagram showing a front view of a self-aligning gear as per a first design aspect, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Certain drawings may include dimensions, such as lengths, diameters, or thicknesses. These dimensions are provided for illustrative purposes only, representing exemplary embodiments, and should not be construed as limiting the scope of the present disclosure in any manner. Variations in dimensions are contemplated and fall within the scope of the present disclosure.

Aspects of this disclosure are directed to a self-aligning gear and a method for a self-aligning gear that compensates for misalignment in gear transmissions. The self-aligning gear of the present disclosure allows controlled tilting of gear components to mitigate the effects of misalignments while restricting torsional, radial, and axial movements that would compromise power transmission efficiency. This compensation capability is achieved through the implementation of a spline design incorporating elastomeric elements that facilitate alignment correction while maintaining structural integrity under load.

Referring to FIG. 1, illustrated is an exemplary diagram of a self-aligning gear (as represented by reference numeral 100), according to a first design aspect. The self-aligning gear 100 of the present disclosure includes a toothed ring gear 102, a spline gear 114, and a curved-faces pin assembly 122. The toothed ring gear 102, the spline gear 114, and the curved-faces pin assembly 122 are configured to receive a shaft 101 (shown schematically). The self-aligning gear 100 is designed to mitigate the effects of misalignments during torque transfer, while simultaneously restricting torsional, radial, and axial movements, except for a controlled degree of tilting. The self-aligning gear 100 achieves this through the proposed spline design integrated into the spline gear 114 that specifically allows for this tilting motion, while firmly restricting other undesirable movements. Further, as shown, the incorporation of an elastomeric material (labelled with reference numeral 128 in FIG. 4C) within the curved-faces pin assembly 122 adds damping to the system, aids in precisely positioning the spline tooth engagement, and minimizes any unwanted free play or backlash. This combination of features results in a gear system capable of handling misalignments without compromising performance. The self-aligning gear 100 of the present disclosure ensures reliable power transmission even under conditions where perfect alignment is difficult to achieve or maintain.

Figure 2:
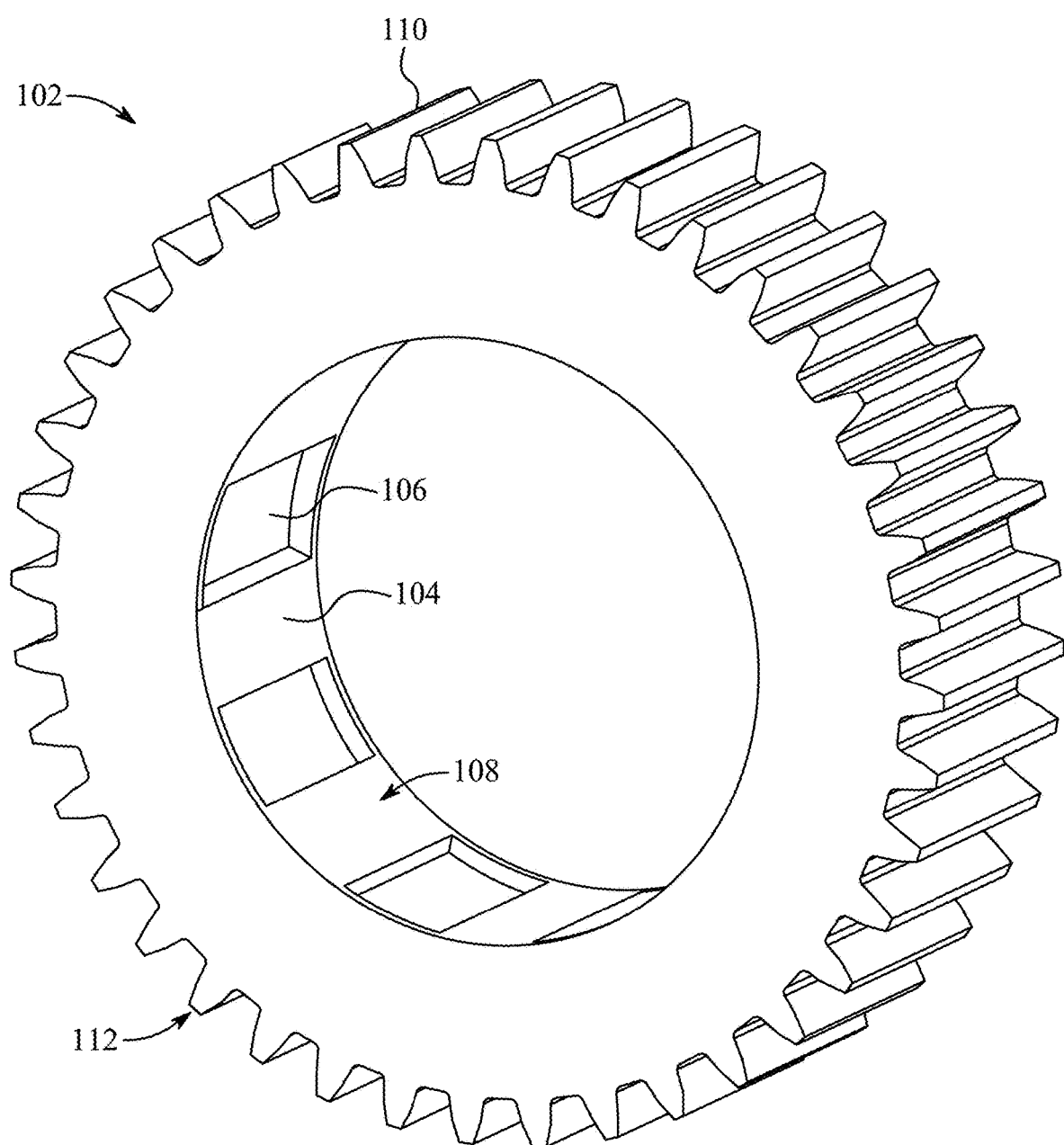
FIG. 2 is an exemplary diagram showing a perspective view of a toothed ring gear of the self-aligning gear as per the first design aspect, according to certain embodiments.

FIG. 2 illustrates a perspective view of the toothed ring gear 102 of the self-aligning gear 100, according to the first design aspect. The toothed ring gear 102 has a plurality of inner gear teeth 104 alternating with a plurality of inner grooves 106 on an inner circumference 108. The toothed ring gear 102 further includes a plurality of outer gear teeth 110 located on an outer circumference 112. The inner gear teeth 104 and the inner grooves 106 are specifically designed to interact with teeth and grooves, respectively, of the spline gear 114 (as discussed later). The alternating arrangement of the inner gear teeth 104 and the inner grooves 106 provides a defined and controlled path for the engagement of the spline gear 114, facilitating interaction between the components. The outer gear teeth 110 are configured for engagement with other gears or power transmission components (not shown), facilitating the transfer of rotational motion to or from the self-aligning gear 100. The geometry of the inner and outer gear teeth 104, 110 facilitates efficient and smooth power transmission. The toothed ring gear 102 is typically manufactured from a rigid, high-strength material, such as steel or a hardened alloy, to withstand the significant forces and stresses associated with gear operation and ensure long-term durability. The specific material choice is dependent on the intended application and the anticipated load requirements, with higher strength materials being used for more demanding applications.

Figure 3A:
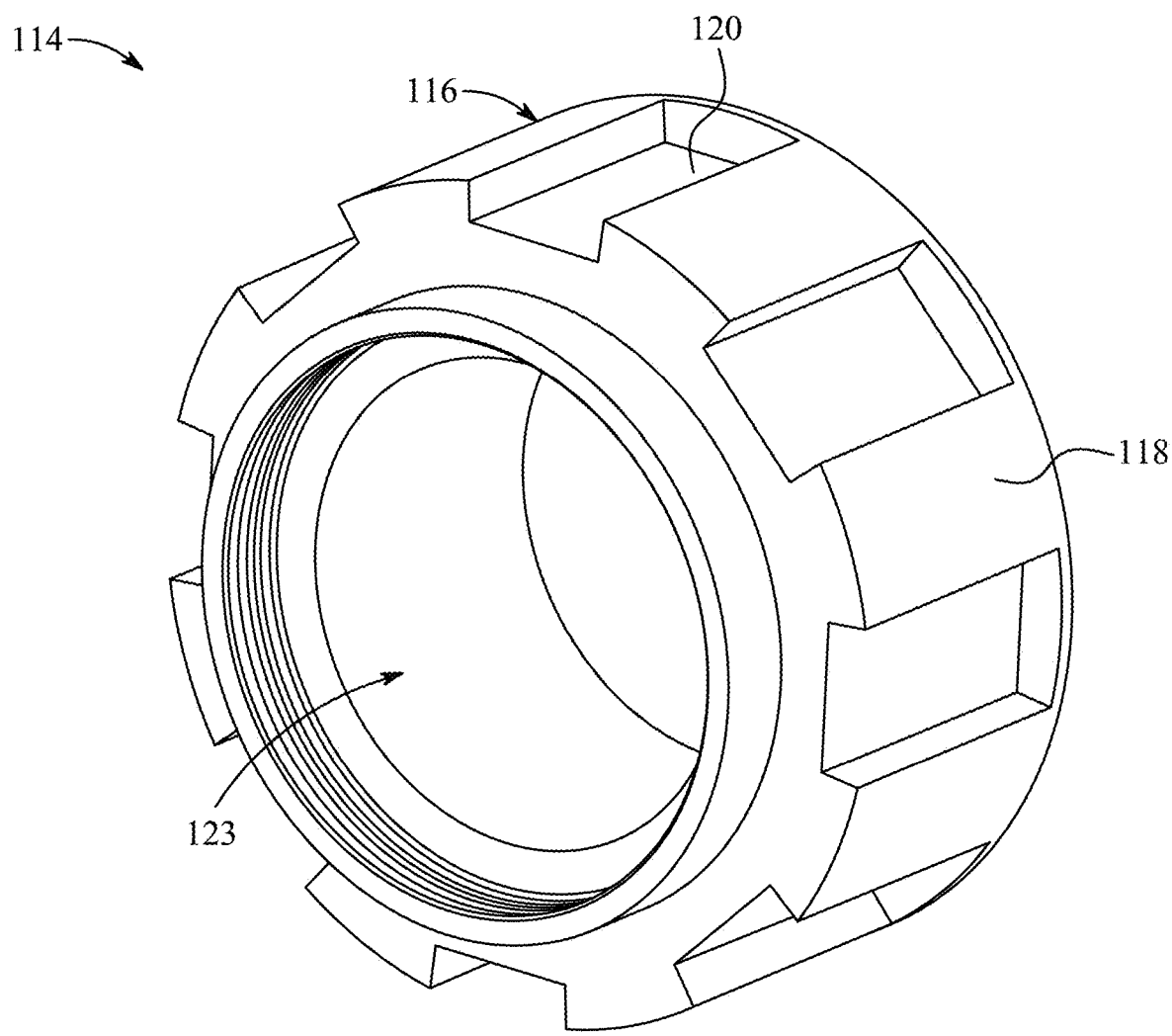
FIG. 3A is an exemplary diagram showing a perspective view of a spline gear of the self-aligning gear as per the first design aspect, according to certain embodiments.
Figure 3B:
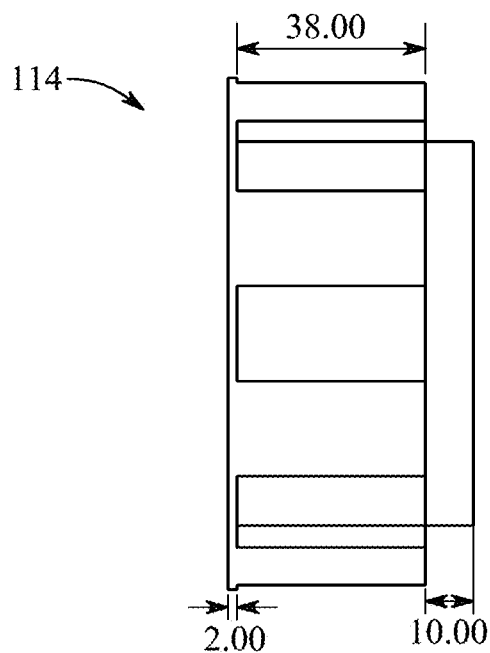
FIG. 3B is an exemplary diagram showing a side view with dimensions of the spline gear as per the first design aspect, according to certain embodiments.
Figure 3C:
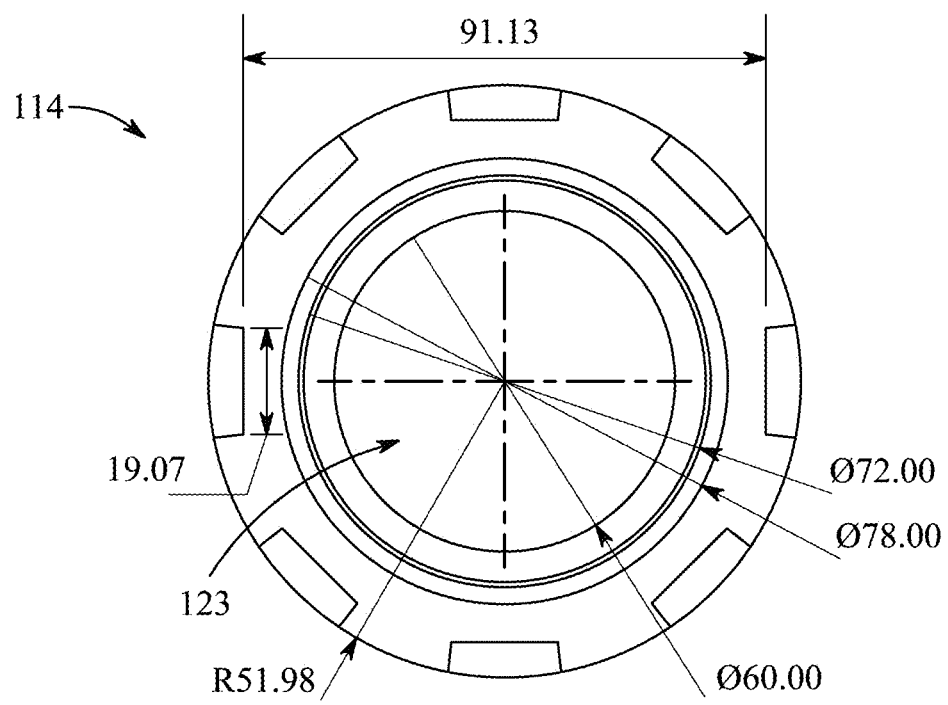
FIG. 3C is an exemplary diagram showing a front view with dimensions of the spline gear as per the first design aspect, according to certain embodiments.

FIGS. 3A, 3B, and 3C illustrate a perspective, a side, and a front view of the spline gear 114 of the self-aligning gear 100, according to the first design aspect, respectively. The spline gear 114 has an outer circumference 116 including a plurality of spline teeth 118 alternating with a plurality of spline grooves 120. The spline teeth 118 are configured to fit in the inner grooves 106 of the toothed ring gear 102 when the spline gear 114 is assembled to the toothed ring gear 102, creating a secure, yet flexible, connection. The spline gear 114 further includes a central opening 123, as most clearly shown in FIG. 3C, which is designed to receive a shaft (not shown), providing the primary means of power input or output for the gear system. The spline teeth 118 are not simply straight-sided projections; but incorporate a slightly curved or oval profile, for providing the tilting capability of the self-aligning gear 100. This curved profile allows for a degree of angular misalignment between the spline gear 114 and the toothed ring gear 102, without disengagement or excessive stress concentration. Herein, the spline grooves 120, located between the spline teeth 118, are dimensioned to accommodate the curved-faces pin assembly 122, providing a space for the damping and aligning elements. The spline gear 114, like the toothed ring gear 102, is typically made from a high-strength material, such as hardened steel, to ensure durability and resistance to wear under load. The dimensions shown in FIGS. 3B and 3C, such as the diameter of the central opening 123, the width and height of the spline teeth 118, and the dimensions of the spline grooves 120, are exemplary design parameters that ensure proper fit and function within the complete assembly.

Figure 4A:
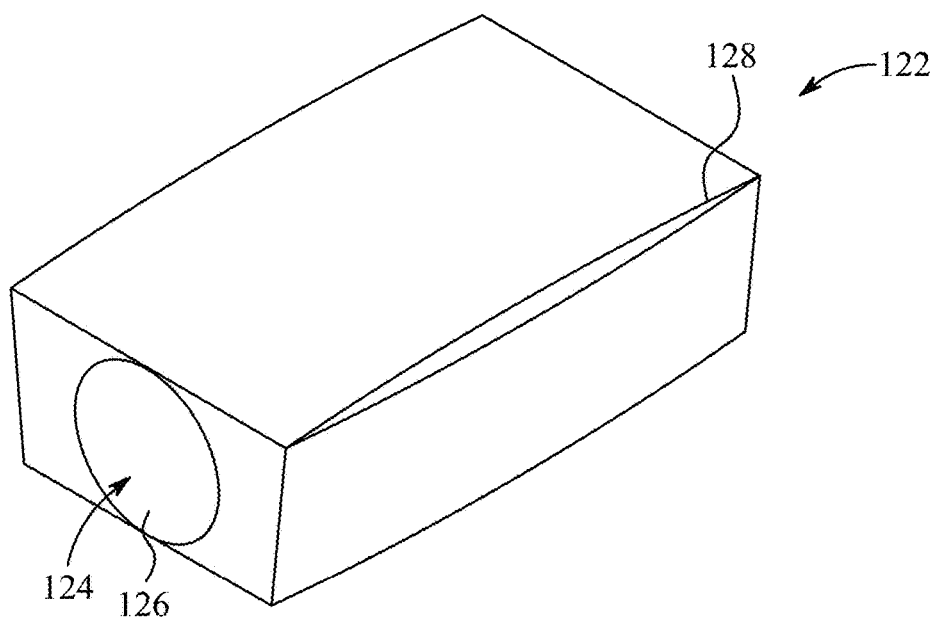
FIG. 4A is an exemplary diagram showing a perspective view of a curved-faces pin assembly as per the first design aspect, according to certain embodiments.
Figure 4B:
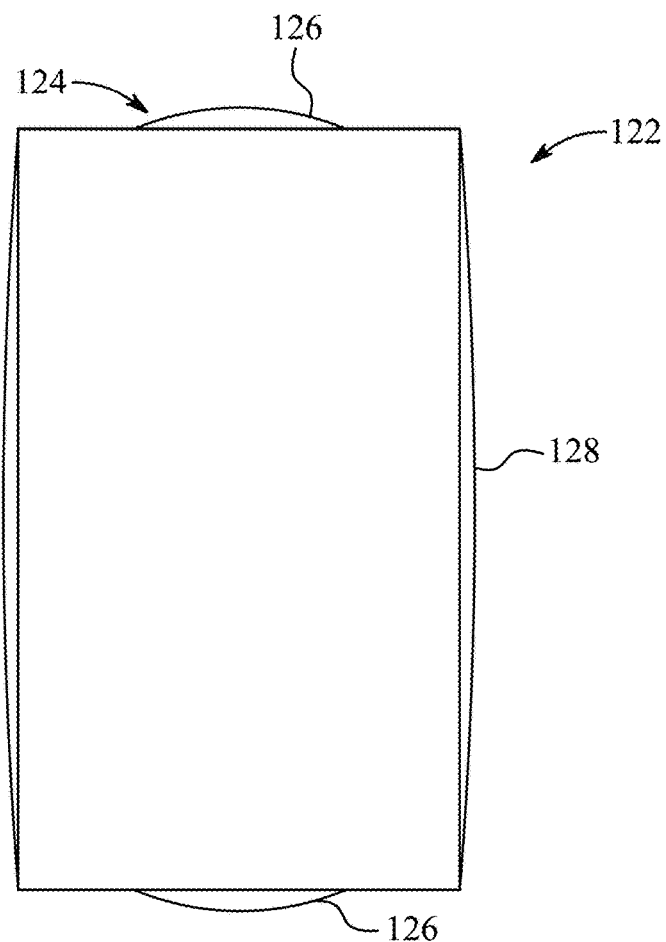
FIG. 4B is an exemplary diagram showing a top view of the curved-faces pin assembly as per the first design aspect, according to certain embodiments.
Figure 4C:
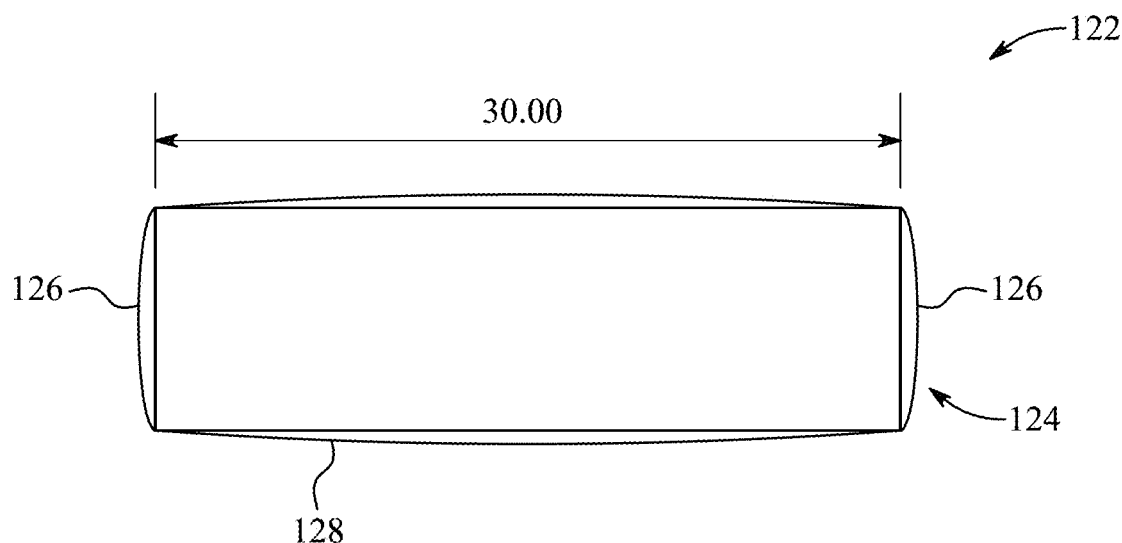
FIG. 4C is an exemplary diagram showing a side view with dimensions of the curved-faces pin assembly as per the first design aspect, according to certain embodiments.
Figure 4D:
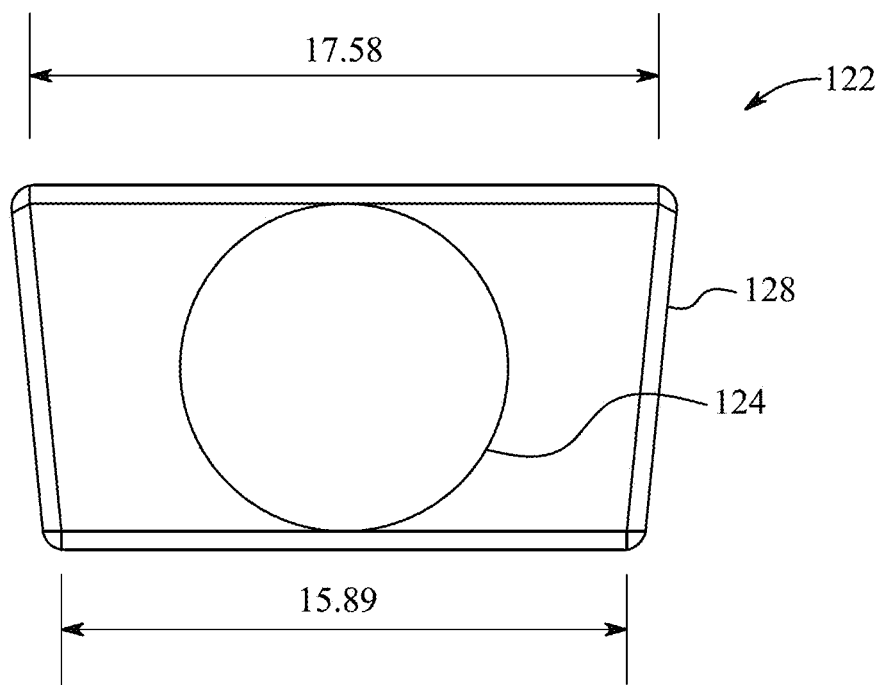
FIG. 4D is an exemplary diagram showing a front view with dimensions of the curved-faces pin assembly as per the first design aspect, according to certain embodiments.

FIGS. 4A, 4B, 4C, and 4D illustrate various views of the curved-faces pin assembly 122 according to the first design aspect. Herein, the curved-faces pin assembly 122 includes a cylindrical pin 124 having semicircular ends 126 and a pattern of an elastomeric material 128. FIG. 4A shows a perspective view, highlighting the overall shape and the integration of the cylindrical pin 124 and the elastomeric material 128. FIG. 4B provides a top view, emphasizing the profile of the semicircular ends 126 of the cylindrical pin 124. FIGS. 4C and 4D show side and front views, respectively, with dimensions indicating the exemplary size and proportions of the curved-faces pin assembly 122. This pattern of elastomeric material 128 conforms to the shape of the spline grooves 120 of the spline gear 114 and the inner grooves 106 of the toothed ring gear 102. This conformity ensures a close fit and optimal interaction between the components.

The cylindrical pin 124 forms the central structural element of the curved-faces pin assembly 122, providing strength and rigidity for torque transmission. The semicircular ends 126 of the cylindrical pin 124 are a design feature, providing a smooth, rounded contact surface that minimizes friction and wear as the pin interacts with the elastomeric material 128 and the walls of the grooves 106, 120. The elastomeric material 128 is molded or otherwise applied to the cylindrical pin 124, creating a layer that conforms to the shape of the grooves 106, 120. This elastomeric material 128 is selected for properties including an ability to withstand high pressures and temperatures, as well as its elastic behavior, which allows it to deform under load and then return to its original shape. This elasticity facilitates the self-aligning function, as it allows the curved-faces pin assembly 122 to accommodate misalignments between the toothed ring gear 102 and the spline gear 114. The dimensions of the curved-faces pin assembly 122, such as the diameter and length of the cylindrical pin 124 and the thickness of the elastomeric material 128, are defined to ensure proper fit and function within the overall gear assembly. The curved faces pin assembly includes an elastomeric pin having a high Young's modulus and a pattern of elastomeric material having a low Young's modulus to permit the pin to shift within the groove when a corresponding gear tooth enters the groove. In the present configuration, the selection of materials and the geometry of the curved-faces pin assembly helps in achieving the design goals of damping, self-alignment, and restricted movement in unwanted directions.

Figure 14A:
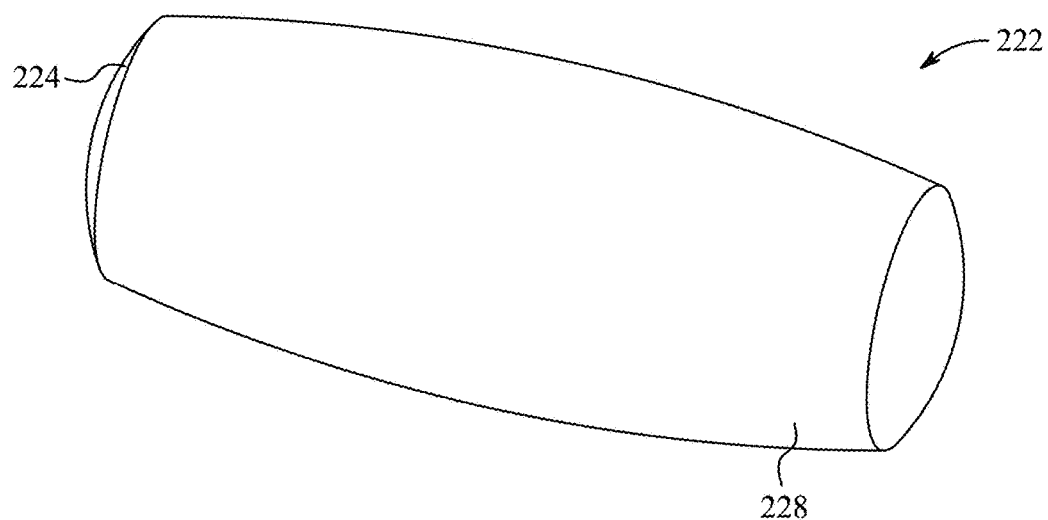
FIG. 14A is an exemplary diagram showing a perspective view of a cylindrical curved-faces pin assembly as per the second design aspect, according to certain embodiments.

The curved faces pin assembly may be molded and machined to form the shape shown in FIG. 14A.

Figure 5A:
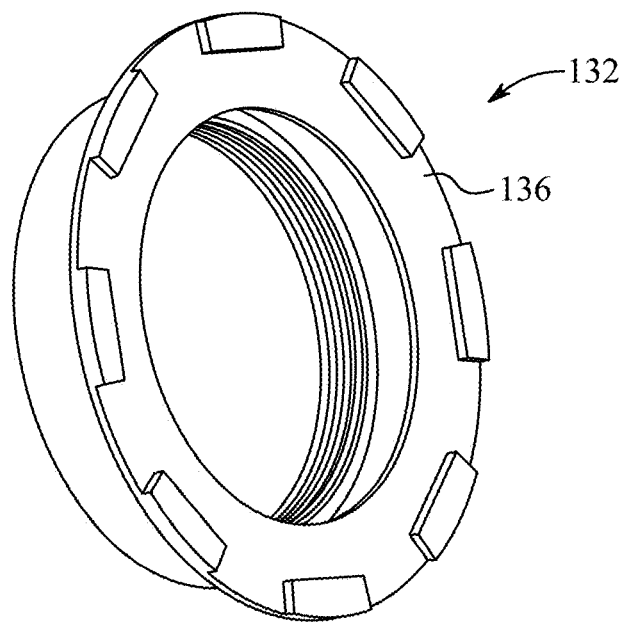
FIG. 5A is an exemplary diagram showing a perspective view of a flanged hub of the self-aligning gear as per the first design aspect, according to certain embodiments.
Figure 5B:
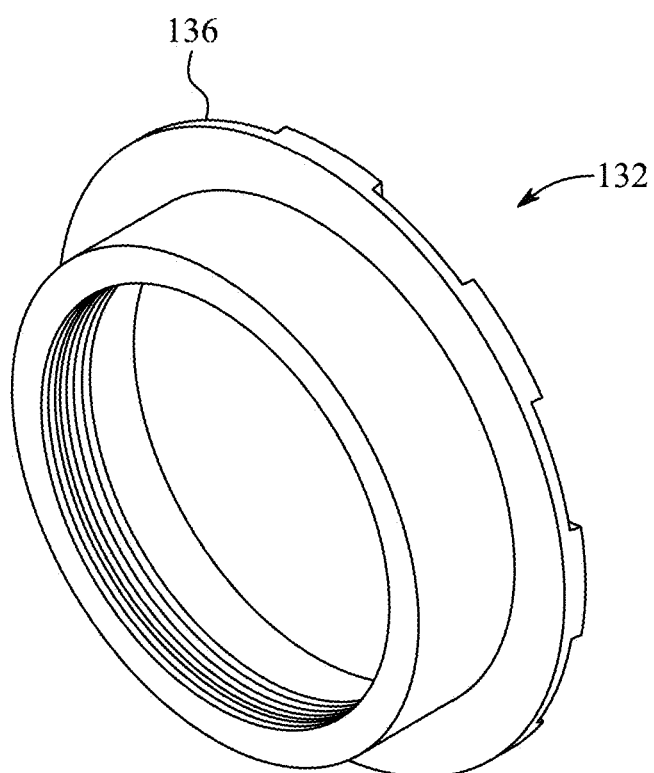
FIG. 5B is an exemplary diagram showing another perspective view of the flanged hub as per the first design aspect, according to certain embodiments.
Figure 5C:
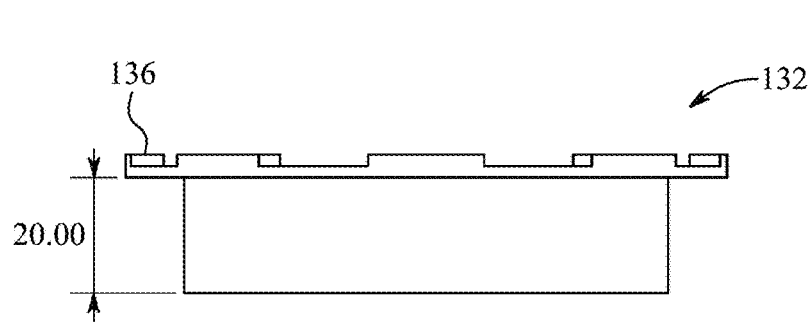
FIG. 5C is an exemplary diagram showing a side view with dimensions of the flanged hub as per the first design aspect, according to certain embodiments.
Figure 5D:
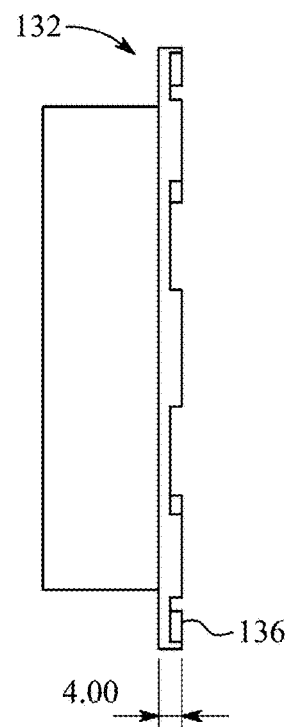
FIG. 5D is an exemplary diagram showing another side view with dimensions of the flanged hub of the self-aligning gear as per the first design aspect, according to certain embodiments.
Figure 5E:
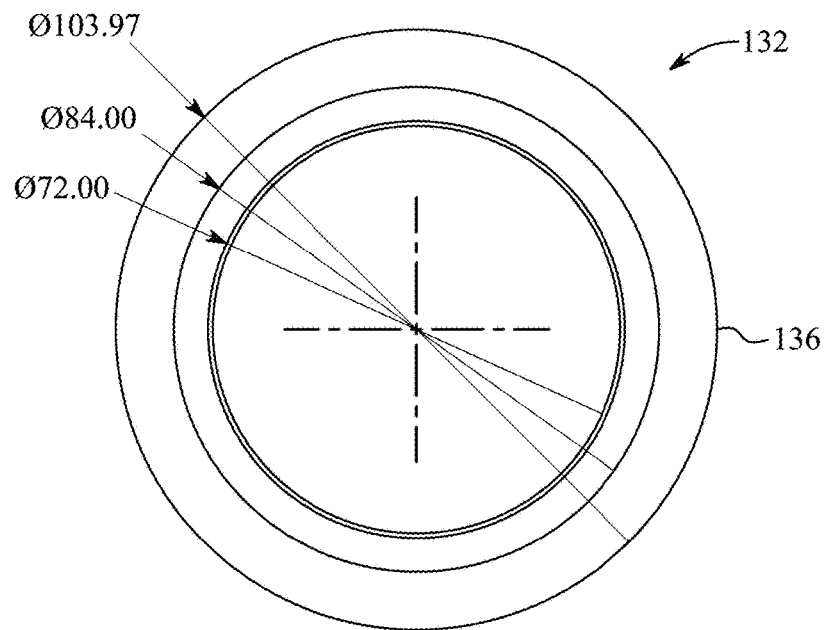
FIG. 5E is an exemplary diagram showing a front view with dimensions of the flanged hub of the self-aligning gear as per the first design aspect, according to certain embodiments.

FIGS. 5A, 5B, 5C, 5D, and 5E illustrate various views of a flanged hub 132, which is a component of a locking assembly of the self-aligning gear 100. Herein, FIGS. 5A and 5B show perspective views, highlighting the overall shape and the flanged portion. FIGS. 5C, 5D, and 5E provide side and front views with dimensions, detailing the exemplary size and proportions of the flanged hub 132. The flanged hub 132 is a generally cylindrical component with a flange 136 at one end. The flange 136 extends radially outward, providing a larger surface area for contact with the spline gear 114. The flanged hub 132 is designed such that the flange 136 is configured to face the spline gear 114 and the toothed ring gear 102 when assembled. The flange 136 presents a substantially flat surface configured to abut the spline gear 114. The surface of the flange 136 includes features to engage with the corresponding features on adjacent surface of the spline gear 114, when assembled, for preventing rotational slippage. Further, a threaded disc (as discussed later) is configured to engage with a set of inner threads of the spline gear 114 and a set of inner threads of the toothed ring gear 102. The flanged hub 132 of the locking assembly is configured to securely connect the spline gear 114 to the toothed ring gear 102. The flange 136 of the flanged hub 132 is specifically configured to face the spline gear 114 and the toothed ring gear 102 when the assembly is complete, providing a broad, flat surface that abuts the spline gear 114. This abutment helps to distribute the clamping force evenly and prevents relative axial movement between the components. The flanged hub 132 is typically made from a strong and rigid material, such as steel, to withstand the clamping forces and maintain the integrity of the gear assembly. The dimensions of the flanged hub 132, including the diameter of the flange 136 and the overall length, are controlled to ensure proper fit and function within the locking assembly.

Figure 6:
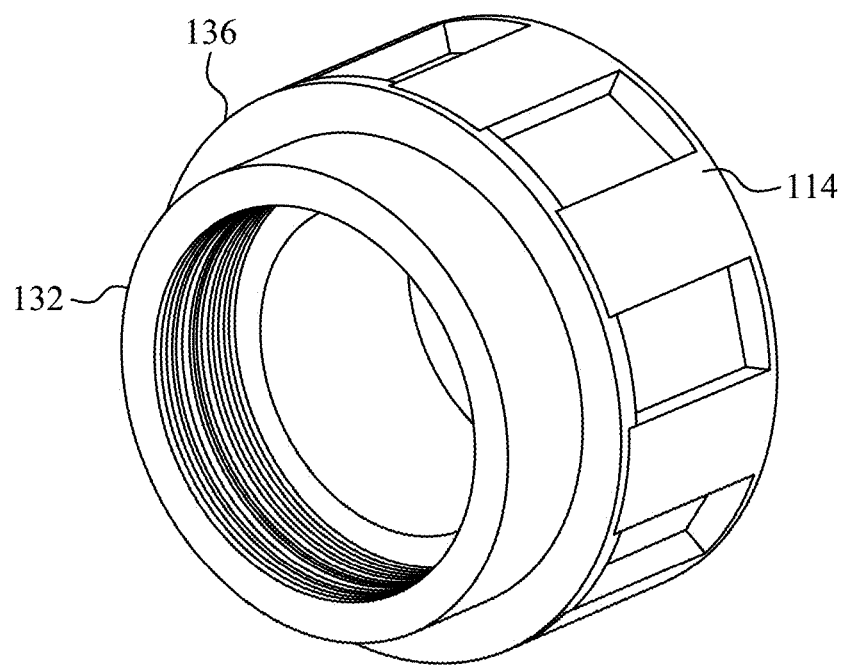
FIG. 6 is an exemplary diagram showing a perspective view of the spline gear assembled with the flanged hub as per the first design aspect, according to certain embodiments.

FIG. 6 illustrates a perspective view of the spline gear 114 assembled with the flanged hub 132, according to the first design aspect. As shown, herein, the flange 136 of the flanged hub 132 abuts the spline gear 114, providing a secure and stable connection. The close proximity of the flanged hub 132 to the spline gear 114 (as shown) highlights the role of the flanged hub 132 in preventing axial movement of the spline gear 114 relative to the toothed ring gear 102 (not shown in this figure). The alignment of the flanged hub 132 and the spline gear 114 facilitates the proper function of the locking assembly. This assembly represents a preliminary stage in the complete assembly of the self-aligning gear 100, illustrating the interaction between the said two components.

Figure 7:
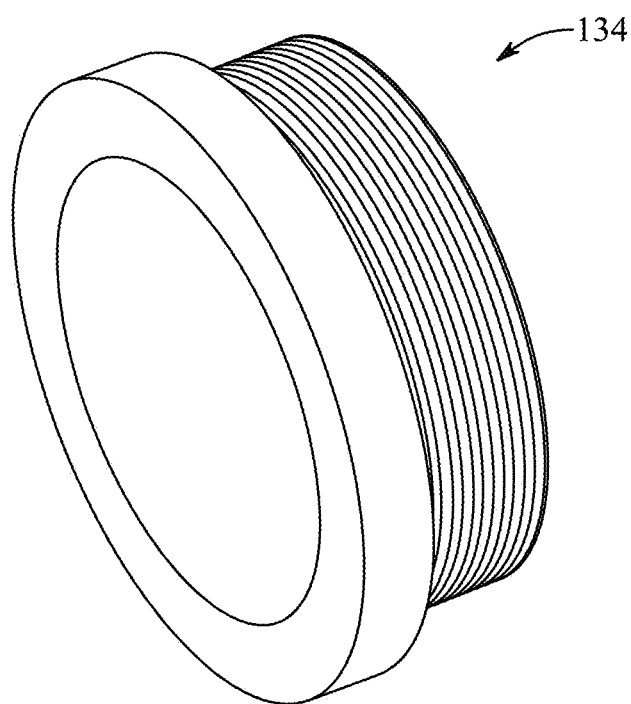
FIG. 7 is an exemplary diagram showing a perspective view of a threaded disc of the self-aligning gear as per the first design aspect, according to certain embodiments.

FIG. 7 illustrates a perspective view of a threaded disc 134, which is another component of the locking assembly of the self-aligning gear 100, according to the first design aspect. The threaded disc 134 is a generally annular component with external threads designed to engage with internal threads on both the spline gear 114 and the toothed ring gear 102. The threaded disc 134 is the active element in the locking assembly that draws the spline gear 114 and the toothed ring gear 102 together, creating a secure and rigid connection. The external threads of the threaded disc 134 are precisely machined to match the internal threads of the spline gear 114 and the toothed ring gear 102, ensuring a tight and secure fit. The threaded disc 134 is typically made from a strong and durable material, such as steel, to withstand the significant forces involved in clamping the gear components together. The diameter and pitch of the threads on the threaded disc 134 are key design parameters that determine the clamping force and the overall strength of the locking assembly. Specifically, the threaded disc 134, in conjunction with the flanged hub 132, provides a mechanism for securing the components of the self-aligning gear 100.

Figure 8:
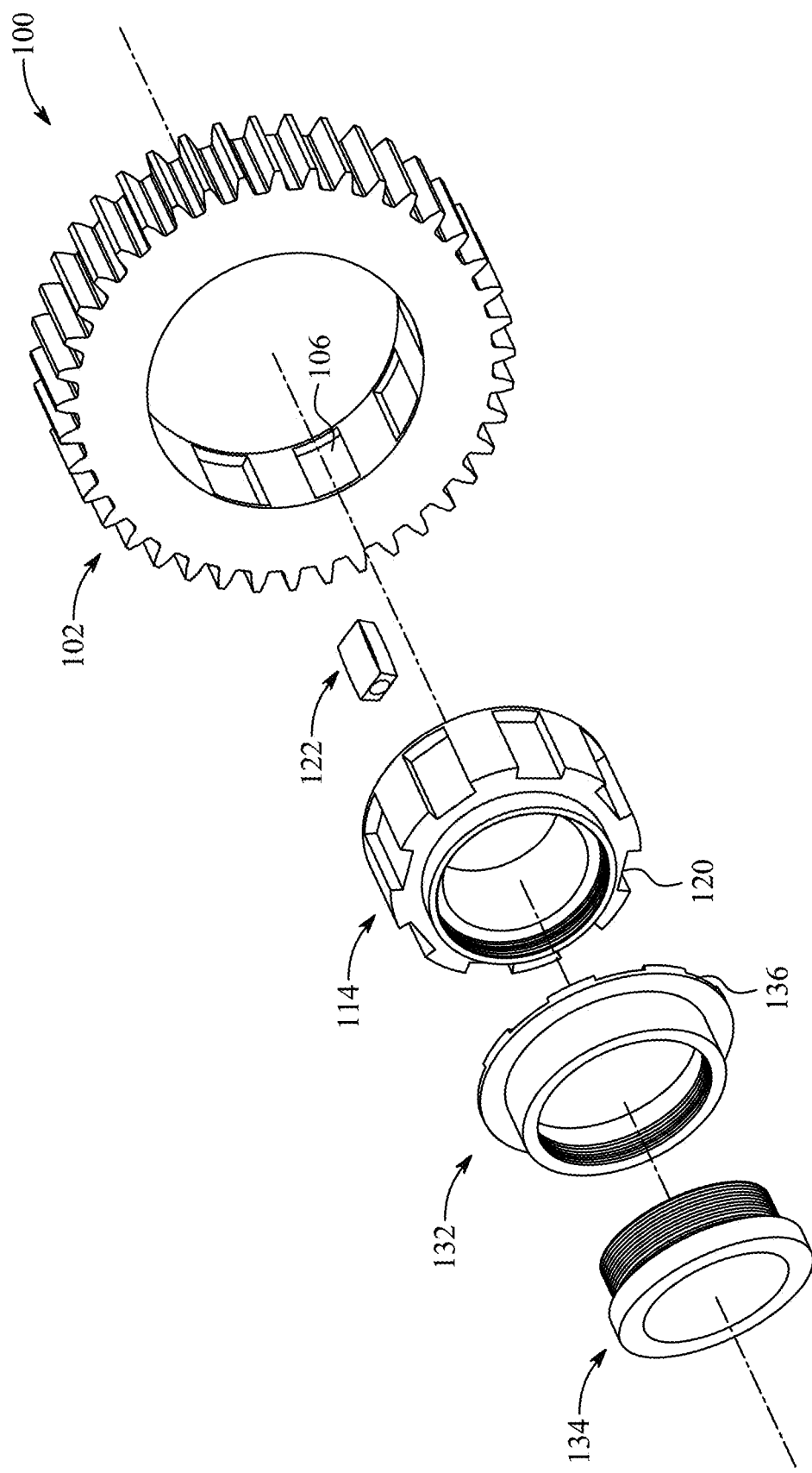
FIG. 8 is an exemplary exploded diagram showing a complete assembly of the self-aligning gear as per the first design aspect, according to certain embodiments.

FIG. 8 illustrates an exploded view of the complete assembly of the self-aligning gear 100, according to the first design aspect. This view shows the spatial relationship between all the major components: the toothed ring gear 102, the spline gear 114, the curved-faces pin assembly 122, the flanged hub 132, and the threaded disc 134, defining the order of assembly and how each component fits together to create the final self-aligning gear 100. Herein, as shown, the toothed ring gear 102 is the outermost component, ready to receive the spline gear 114. The curved-faces pin assemblies 122 are positioned to be inserted into the inner grooves 106 of the toothed ring gear 102 and the spline grooves 120 of the spline gear 114. The flanged hub 132 is aligned to abut the spline gear 114, and the threaded disc 134 is positioned to engage with the internal threads of both the spline gear 114 and the toothed ring gear 102. This exploded view provides an overview of the assembly process and the interaction between all the components of the self-aligning gear 100, clearly illustrating how the individual parts combine to form the self-aligning gear 100.

In the self-aligning gear 100 of the present disclosure, each of the plurality of inner grooves 106 and each of the plurality of spline grooves 120 has trapezoidal walls. Herein, a length of a base of each trapezoidal wall is less than a length of a top surface of the trapezoidal wall. That is, the inner grooves 106 of the toothed ring gear 102 and the spline grooves 120 of the spline gear 114 are not simple rectangular channels, but have a distinct trapezoidal cross-sectional profile, as defined by their trapezoidal walls. This trapezoidal shape means that each groove 106, 120 is wider at its opening (the top surface) than at its bottom (the base). Further, the curved-faces pin assembly 122 has same trapezoidal shape. Herein, in particular, the length of the base of each trapezoidal wall is less than the length of the top surface of that same trapezoidal wall. This difference in length creates an inwardly converging profile for the groove 106, 120. This converging profile contributes to the self-aligning function of the self-aligning gear 100. The angled trapezoidal walls guide the curved-faces pin assembly 122 into the groove 106, 120 and promote a self-centering action. The trapezoidal shape also helps to distribute the contact forces between the curved-faces pin assembly 122 and the groove walls more evenly, reducing stress concentrations that could lead to premature wear or failure. The trapezoidal geometry, therefore, contributes to both the alignment and the durability of the self-aligning gear 100.

In an aspect, the length of the top surface of each trapezoidal wall is about 2 mm larger than a length of the base. This difference is a chosen design parameter that provides a controlled amount of convergence in the groove profile. This degree of convergence is sufficient to facilitate the self-centering action of the curved-faces pin assembly 122 within the groove 106, 120, but not so excessive as to create undue wedging forces that would make assembly difficult or hinder the desired tilting motion. This dimensional relationship ensures a balance between ease of assembly, secure retention of the curved-faces pin assembly 122, and the ability of the self-aligning gear 100 to accommodate misalignments.

Figure 9:
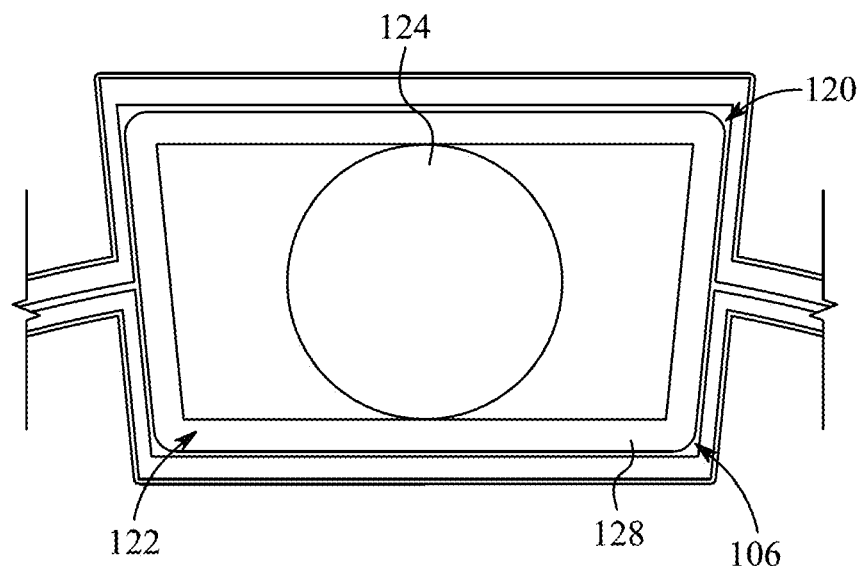
FIG. 9 is an exemplary diagram showing a detailed view of the curved-faces pin assembly in assembled form as per the first design aspect, according to certain embodiments.

FIG. 9 illustrates a detailed view of the curved-faces pin assembly 122 within the groove 106, 120, according to the first design aspect. This detailed view shows the pattern including a layer of the elastomeric material 128 which covers the trapezoidal walls and base of each groove 106, 120. This complete coverage ensures that there is no direct metal-to-metal contact between the cylindrical pin 124 and the walls of the grooves 106, 120. The elastomeric material 128 acts as a buffer, absorbing vibrations and distributing loads more evenly. The layer of the elastomeric material 128, by conforming to the trapezoidal shape, also contributes to the self-centering action, guiding the curved-faces pin assembly 122 into its proper position within the groove 106, 120.

In order to install each curved-faces pin assembly 122 into the toothed ring gear 102, each curved faces pin assembly 122 is placed in an inner groove 106 of the toothed ring gear 102. The spline gear 114 is then pushed into the central opening of the toothed ring gear 102 so that each spline tooth 118 compresses a curved-faces pin assembly 122. The flanged hub 132 is then inserted into the central opening of the spline gear 114 until the flange abuts the faces of the toothed ring gear 102 and the spline gear 114. The external threads of the threaded disc 134 are then screwed onto the inner threads of the flanged hub 132 until the threaded disc 134 abuts the opposite faces of the toothed ring gear 102 and the spline gear 114.

The curved faces pin is made of steel and machined to form the curved-faces. The pin is surrounded by a soft material in order to address the misalignment or tilting. The soft material can be any one of mono cast nylon and polyacetal plastic. Mono cast nylon is a polyamide resin produced by a "casting method" where monomers are injected into a mold and polymerized simultaneously, which minimizes resin distortion, resulting in a strong, high performance nylon. Polyacetyl plastic is a high-performance thermoplastic polymer.

In an aspect, the layer of the elastomeric material 128 has a depth of from about 1 to about 5 mm, preferably about 2 to about 4 mm, or about 3 mm. This depth provides a sufficient amount of elastomeric material 128 to effectively cushion the interaction between the curved-faces pin assembly 122 and the walls of the grooves 106, 120. This cushioning effect helps in absorbing vibrations and accommodating misalignments without transmitting excessive stresses to the other components of the gear system. Such depth represents a balance between providing adequate compliance and maintaining the overall structural integrity of the curved-faces pin assembly 122.

In the self-aligning gear 100, the cylindrical pin 124 of the curved faces pin assembly 122 is centrally located between the trapezoidal walls and parallel to the shaft 101, 201. This central positioning ensures that the forces transmitted through the pin 124 are distributed symmetrically, minimizing any tendency for the pin 124 to bind or tilt unevenly within the groove. The parallel alignment ensures that the rotational motion is transmitted smoothly and efficiently.

Further, the semicircular ends 126 are configured to press fit into the layer of elastomeric material 128. This press fit creates a secure and interference-based connection between the pin 124 and the elastomeric material 128, preventing any unwanted movement or slippage. The press fit also contributes to the damping characteristics of the assembly, as it pre-loads the elastomeric material 128, enhancing its ability to absorb energy.

Figure 10:
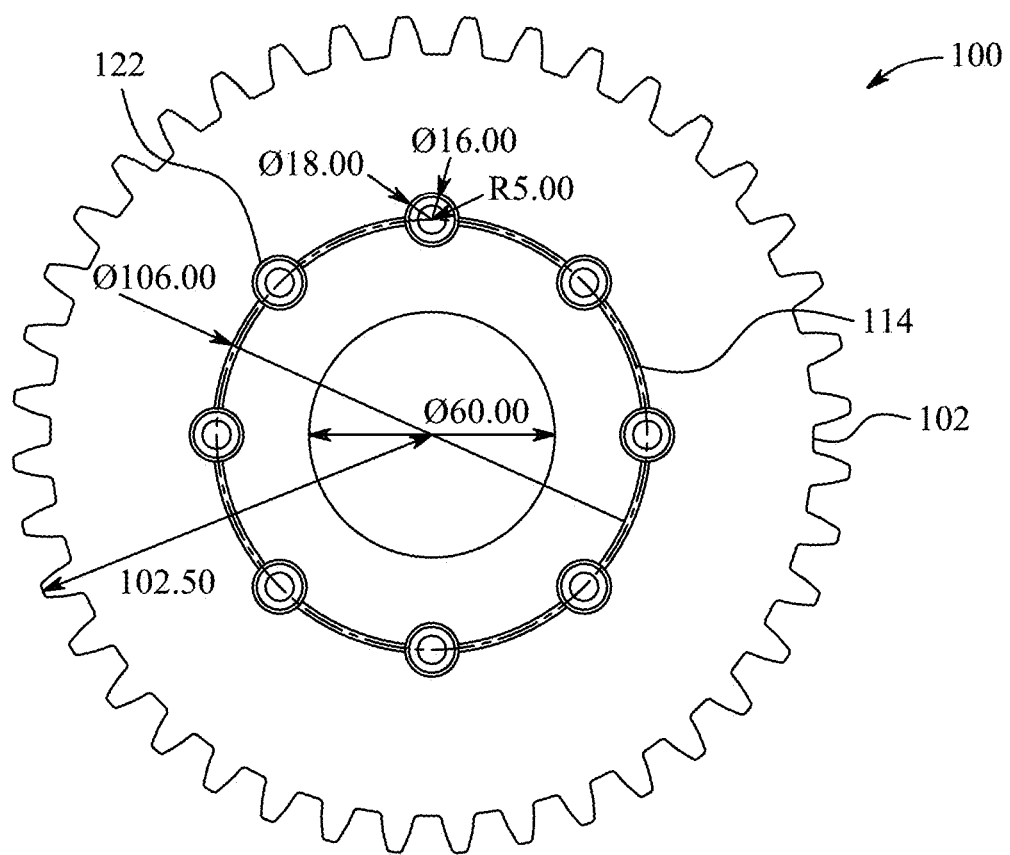
FIG. 10 is an exemplary diagram showing a front view with dimensions of the self-aligning gear as per the first design aspect, according to certain embodiments.

FIG. 10 illustrates a front view of the assembled self-aligning gear 100, according to the first design aspect. This view shows the toothed ring gear 102, the spline gear 114 (represented by its outer circumference and central opening), and the locations of the curved-faces pin assemblies 122 (represented by circles within the grooves). This assembled view provides a clear representation of the final configuration of the self-aligning gear 100, with all components in their operational positions. The relative positions of the toothed ring gear 102 and the spline gear 114, and the arrangement of the curved-faces pin assemblies 122 within the grooves, lead to the integration of all the individual components into the overall structure of the self-aligning gear 100 in its assembled state and into a functional unit.

Figure 11:
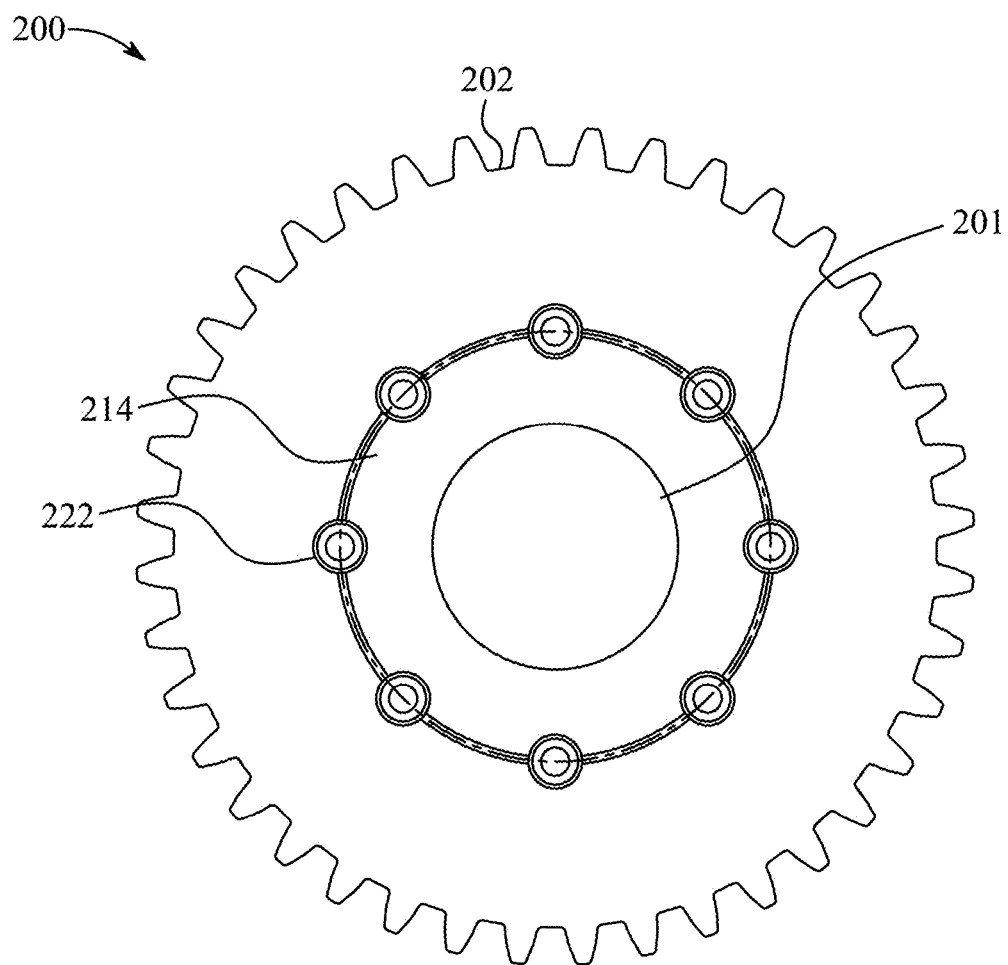
FIG. 11 is an exemplary diagram showing a front view of a self-aligning gear as per a second design aspect, according to certain embodiments.

Referring now to FIG. 11, illustrated is an exemplary diagram of a self-aligning gear (as represented by reference numeral 200), according to a second design aspect. The self-aligning gear 200 includes a toothed ring gear 202, a spline gear 214, and a curved-faces pin assembly 222. The toothed ring gear 202, the spline gear 214, and the curved-faces pin assembly 222 are configured to receive a shaft 201 (shown schematically). Similar to the first design aspect, the self-aligning gear 200 of the second design aspect is also designed to mitigate the effects of misalignments during torque transfer while restricting torsional, radial, and axial movements, other than a controlled amount of tilting. The self-aligning gear 200 achieves this through a spline design, integrated into the spline gear 214, that specifically allows for this tilting motion, while firmly restricting other undesirable movements. The incorporation of an elastomeric material (labelled with reference numeral 228) within the curved-faces pin assembly 222 adds damping to the system, contributes to precisely positioning the spline tooth engagement, and minimizes unwanted free play or backlash. The second design aspect, while generally sharing the same configuration as the first design aspect, employs a different groove geometry and curved-faces pin assembly configuration to achieve these goals. This alternative design provides flexibility in adapting the self-aligning gear to different application requirements or manufacturing constraints.

Figure 12:
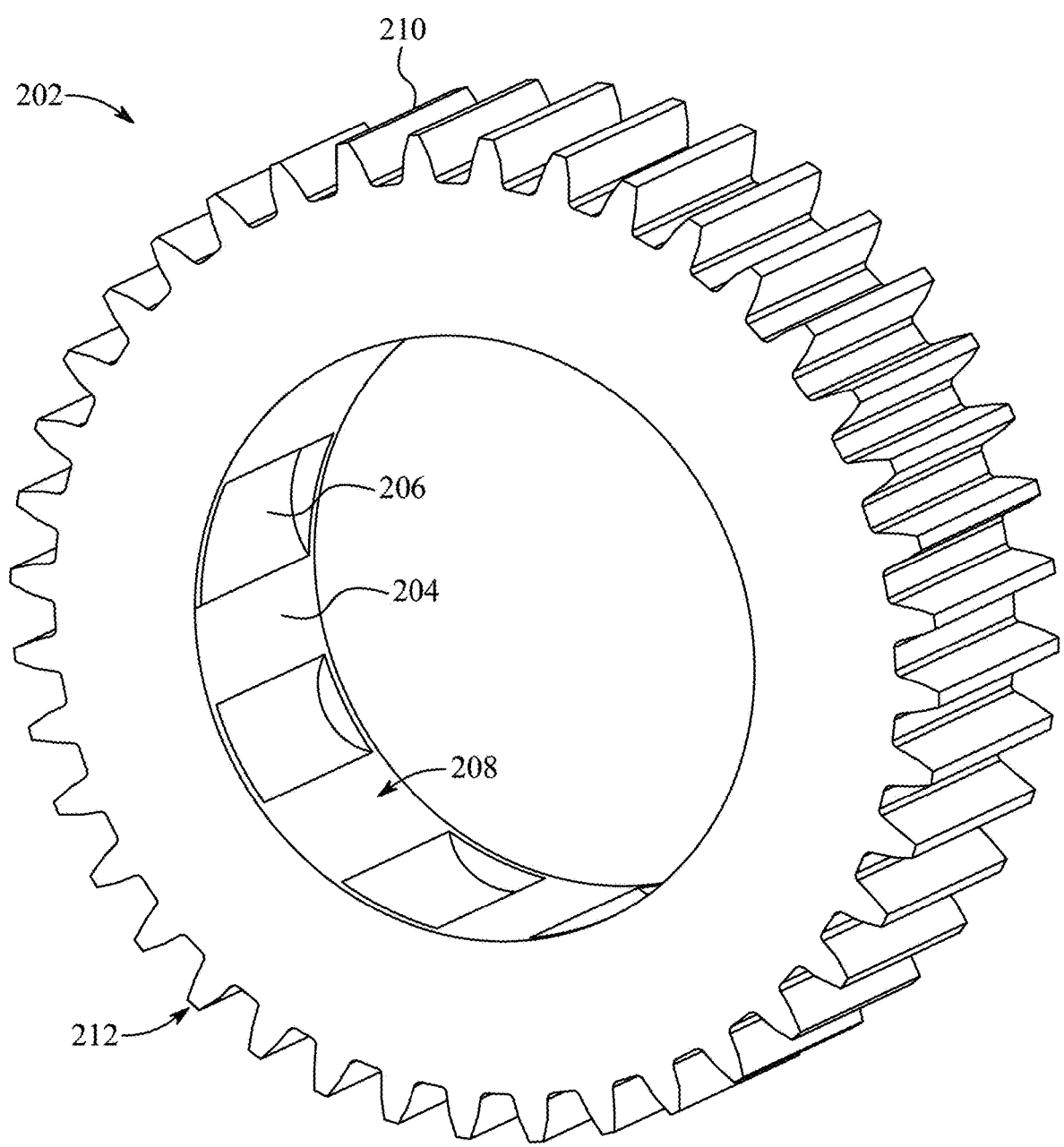
FIG. 12 is an exemplary diagram showing a perspective view of a toothed ring gear of the self-aligning gear as per the second design aspect, according to certain embodiments.

FIG. 12 illustrates a perspective view of the toothed ring gear 202 of the self-aligning gear 200, according to the second design aspect. The toothed ring gear 202 has a plurality of inner gear teeth 204 alternating with a plurality of inner grooves 206 on an inner circumference 208. The toothed ring gear 202 further includes a plurality of outer gear teeth 210 located on an outer circumference 212. The inner gear teeth 204 and the inner grooves 206 are specifically designed to interact with teeth and grooves, respectively, of the spline gear 214. The alternating arrangement of the inner gear teeth 204 and the inner grooves 206 provides a defined and controlled path for the engagement of the spline gear 214, ensuring precise interaction between the components. The outer gear teeth 210 are configured for engagement with other gears or power transmission components (not shown), facilitating the transfer of rotational motion to or from the self-aligning gear 200. The toothed ring gear 202 of the second design aspect, similar to the toothed ring gear 102 of the first design aspect, may be typically manufactured from a rigid, high-strength material, such as steel or a hardened alloy, to ensure durability and resistance to wear.

Figure 13A:
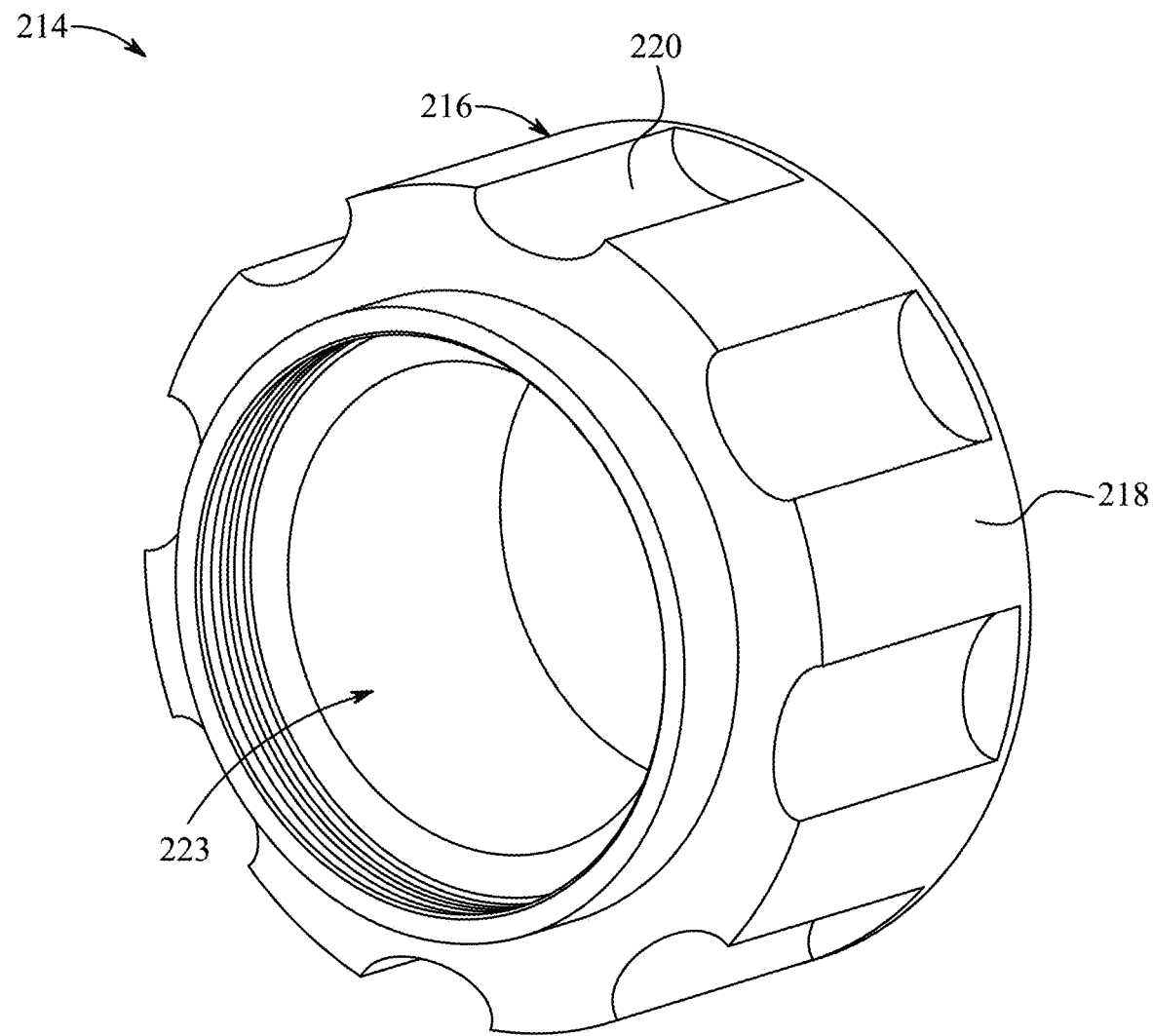
FIG. 13A is an exemplary diagram showing a perspective view of a spline gear of the self-aligning gear as per the second design aspect, according to certain embodiments.
Figure 13B:
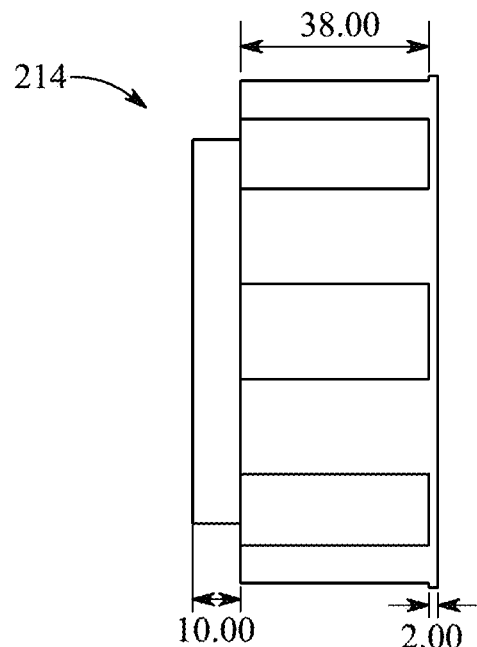
FIG. 13B is an exemplary diagram showing a side view with dimensions of the spline gear as per the second design aspect, according to certain embodiments.
Figure 13C:
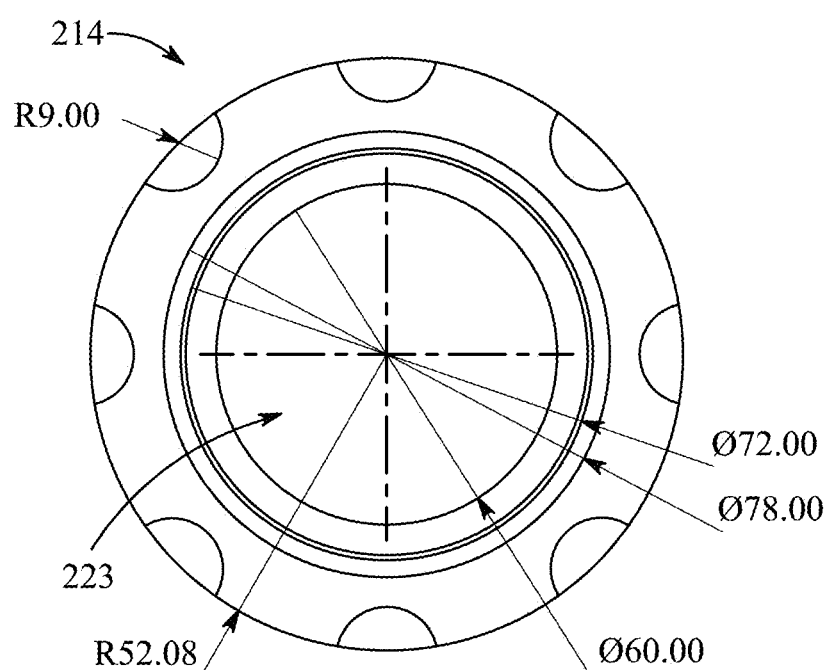
FIG. 13C is an exemplary diagram showing a front view with dimensions of the spline gear as per the second design aspect, according to certain embodiments.

FIGS. 13A, 13B, and 13C illustrate a perspective, a side, and a front view of the spline gear 214 of the self-aligning gear 200, according to the second design aspect, respectively. The spline gear 214 has an outer circumference 216 including a plurality of spline teeth 218 alternating with a plurality of spline grooves 220. The spline teeth 218 are configured to fit in the inner grooves 206 of the toothed ring gear 202 when the spline gear 214 is assembled to the toothed ring gear 202. The spline gear 214 further includes a central opening 223, most clearly seen in FIG. 13C, which is designed to receive a shaft (not shown), providing the primary means of power input or output. The spline teeth 218, similar to the first design aspect, have a specialized profile that contributes to the tilting capability of the self-aligning gear 200. The spline grooves 220, however, have a different geometry in this second design aspect, featuring semicylindrical walls, as is discussed in more detail below. This difference in groove geometry is a key distinguishing feature between the two design aspects. The spline gear 214 is manufactured from a high-strength material to withstand operational loads and ensure long-term reliability.

Figure 14B:
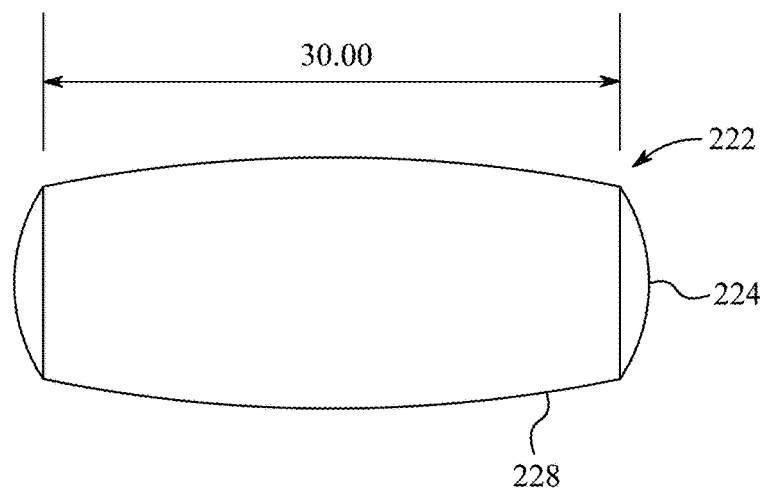
FIG. 14B is an exemplary diagram showing a side view with dimensions of the cylindrical curved-faces pin assembly as per the second design aspect, according to certain embodiments.
Figure 14C:
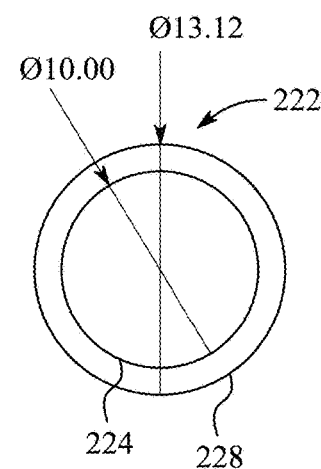
FIG. 14C is an exemplary diagram showing a cross-sectional view with dimensions of the cylindrical curved-faces pin assembly as per the second design aspect, according to certain embodiments.

FIGS. 14A, 14B, and 14C illustrate various views of the curved-faces pin assembly 222, according to the second design aspect. Herein, the curved-faces pin assembly 222 includes a cylindrical pin 224 having semicircular ends and a pattern of an elastomeric material 228. FIG. 14A shows a perspective view, highlighting the cylindrical shape of the pin 224 and the surrounding elastomeric material 228. FIG. 14B provides a side view, with dimensions indicating the length of the curved-faces pin assembly 222. Herein, each of the plurality of inner grooves 206 and each of the plurality of spline grooves 220 has semicylindrical walls. That is, the cross-section of each groove 206, 220 is a half-circle. This semicylindrical shape is specifically designed to accommodate the cylindrical pin 224 of the curved-faces pin assembly 222, allowing for a rolling motion in addition to the tilting capability. Further, a length of the cylindrical pin 224 of each curved-faces assembly 222 is equal to a length of each of the inner grooves 206 and a length of each of the spline grooves 220 measured along an axis from a back side of the spline gear 214 to a front side of the spline gear 214 and parallel to the shaft 101, 201. This equal length and parallel orientation ensure that the cylindrical pin 224 fully engages with the grooves 206, 220 along their entire length, providing consistent support and preventing any axial shifting of the pin 224.

In this second design aspect, the pattern includes a layer of the elastomeric material 228 which surrounds the cylindrical pin 224. FIG. 14C shows a cross-sectional view, clearly illustrating the cylindrical pin 224 encased within the layer of the elastomeric material 228. This layer of the elastomeric material 228 provides a continuous, compliant interface between the cylindrical pin 224 and the semicylindrical walls of the grooves 206, 220. The elastomeric material 228, similar to the first design aspect, is chosen for its ability to withstand high pressure and temperature, and for its elastic behavior, which allows it to deform under load and then return to its original shape, contributing to the self-aligning capability.

In an aspect, the layer of the elastomeric material 228 has a depth of about 3 mm. This depth provides a sufficient amount of elastomeric material 228 to effectively cushion the interaction between the cylindrical pin 224 and the semicylindrical walls of the grooves 206, 220. This cushioning helps in absorbing vibrations and accommodating misalignments. The proposed depth represents an optimized balance between providing adequate compliance for self-alignment and maintaining the overall structural integrity and stiffness of the curved-faces pin assembly 222.

Figure 15A:
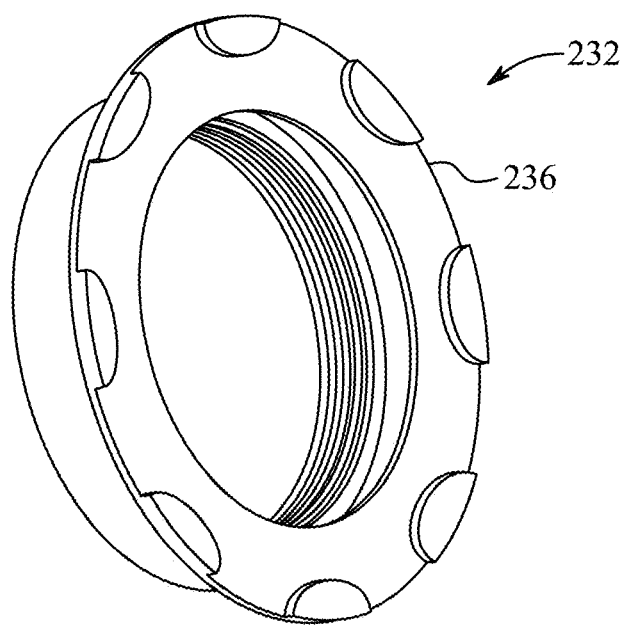
FIG. 15A is an exemplary diagram showing a perspective view of a flanged hub of the self-aligning gear as per the second design aspect, according to certain embodiments.
Figure 15B:
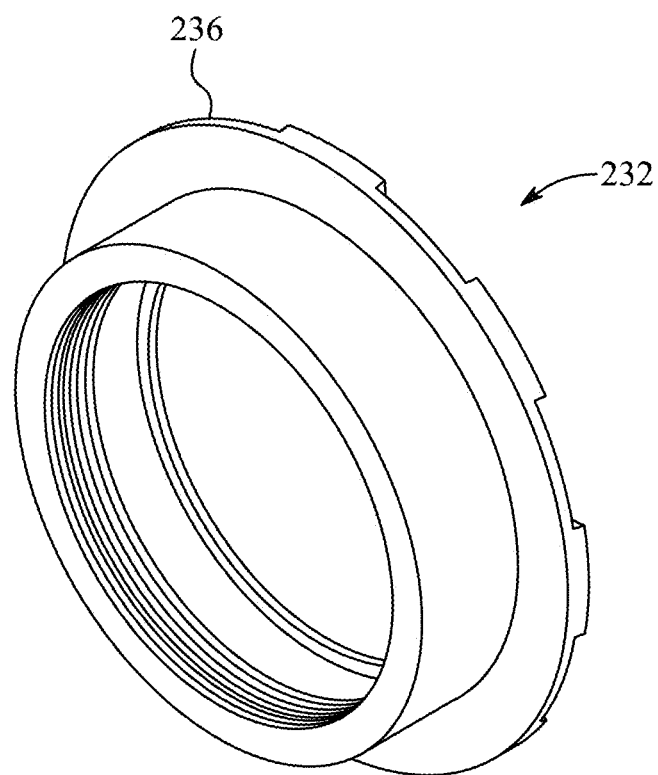
FIG. 15B is an exemplary diagram showing another perspective view of the flanged hub as per the second design aspect, according to certain embodiments.
Figure 15C:
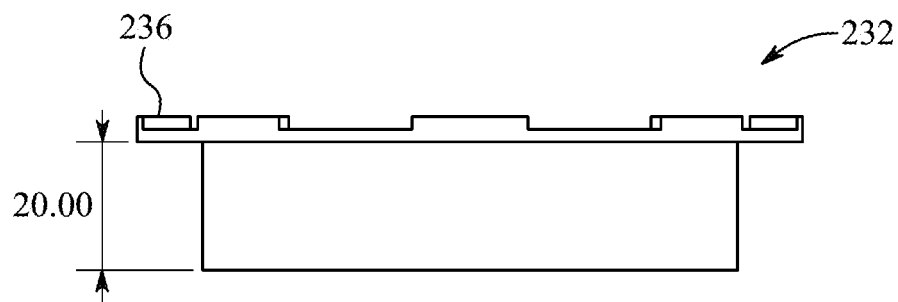
FIG. 15C is an exemplary diagram showing a side view with dimensions of the flanged hub as per the second design aspect, according to certain embodiments.
Figure 15D:
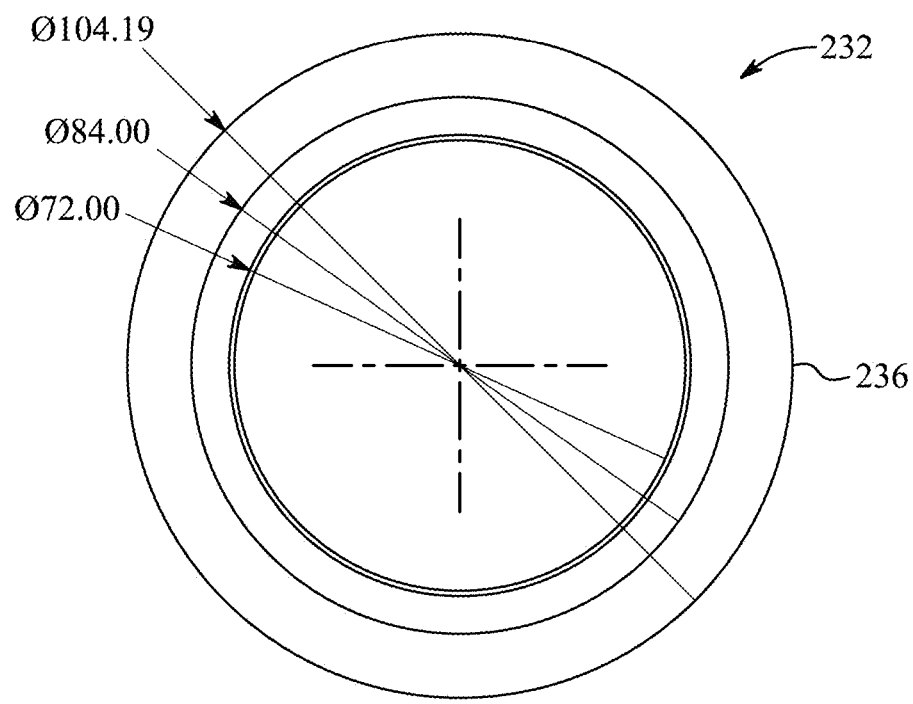
FIG. 15D is an exemplary diagram showing a front view with dimensions of the flanged hub as per the second design aspect, according to certain embodiments.

FIGS. 15A, 15B, 15C, and 15D illustrate various views of a flanged hub 232, which is a component of the locking assembly of the self-aligning gear 200. FIGS. 15A and 15B show perspective views, highlighting the overall shape and the flanged portion. FIGS. 15C and 15D provide side and front views with dimensions, detailing the exemplary size and proportions of the flanged hub 232. The flanged hub 232 is a generally cylindrical component with a flange 236 at one end. The flange 236 extends radially outward, providing a larger surface area for contact with the spline gear 214. The flanged hub 232 is a key part of a locking assembly, which is configured to securely connect the spline gear 214 to the toothed ring gear 202. The flange 236 of the flanged hub 232 is specifically configured to face the spline gear 214 and the toothed ring gear 202 when the assembly is complete, providing a broad, flat surface that abuts the spline gear 214. This abutment helps to distribute the clamping force evenly and prevents relative axial movement between the components. The flanged hub 232, similar to the flanged hub 132 in the first design aspect, may be made from a strong and rigid material, such as steel.

Figure 16:
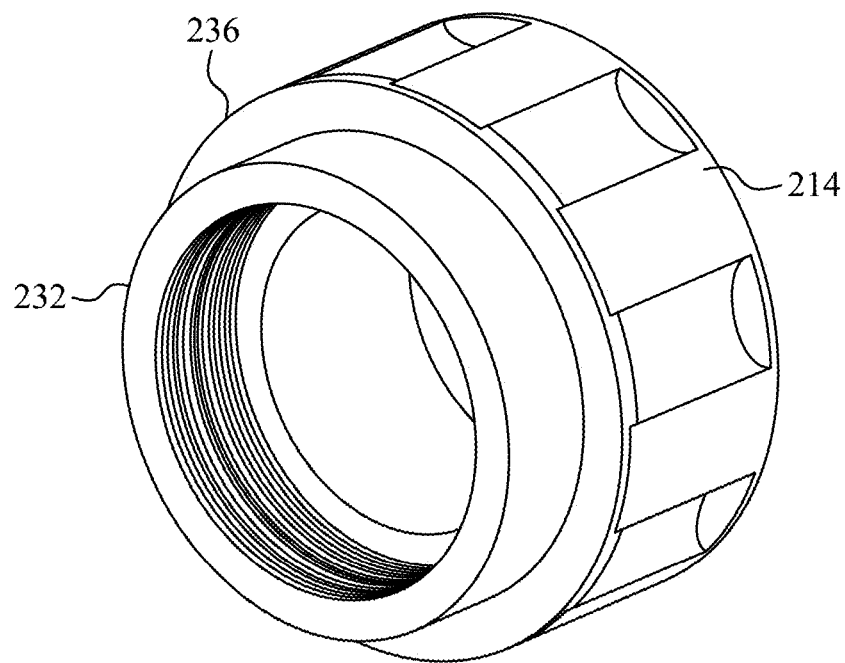
FIG. 16 is an exemplary diagram showing a perspective view of the spline gear assembled with the flanged hub as per the second design aspect, according to certain embodiments.

FIG. 16 illustrates a perspective view of the spline gear 214 assembled with the flanged hub 232, according to the second design aspect. As shown, herein, the flange 236 of the flanged hub 232 abuts the spline gear 214, providing a secure and stable connection. The close proximity of the flanged hub 232 to the spline gear 214 highlights the role of the flanged hub 232 in preventing axial movement of the spline gear 214 relative to the toothed ring gear 202 (not shown in this figure). The alignment of the flanged hub 232 and the spline gear 214 facilitates the proper function of the locking assembly. This assembly represents a preliminary stage in the complete assembly of the self-aligning gear 200, showcasing the interaction between the said two components.

Figure 17:
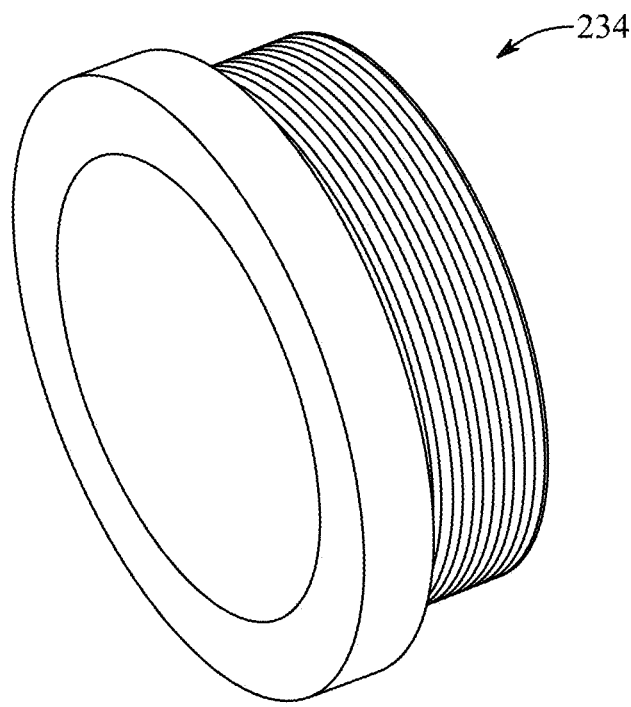
FIG. 17 is an exemplary diagram showing a perspective view of a threaded disc of the self-aligning gear as per the second design aspect, according to certain embodiments.

FIG. 17 illustrates a perspective view of a threaded disc 234, which is another component of the locking assembly of the self-aligning gear 200, according to the second design aspect. The threaded disc 234 is a generally annular component with external threads designed to engage with internal threads on both the spline gear 214 and the toothed ring gear 202. The threaded disc 234 is the active element in the locking assembly that draws the spline gear 214 and the toothed ring gear 202 together, creating a secure and rigid connection, preventing axial movement. The external threads of the threaded disc 234 are precisely machined to match the internal threads of the spline gear 214 and the toothed ring gear 202, ensuring a tight and secure fit. The threaded disc 234 is made from a strong and durable material to withstand the significant forces involved in clamping the gear components together. The diameter and pitch of the threads on the threaded disc 234 are key design parameters that determine the clamping force and the overall strength of the locking assembly. Specifically, the threaded disc 234, in conjunction with the flanged hub 232, provides a mechanism for securing the components of the self-aligning gear 200.

Figure 18:
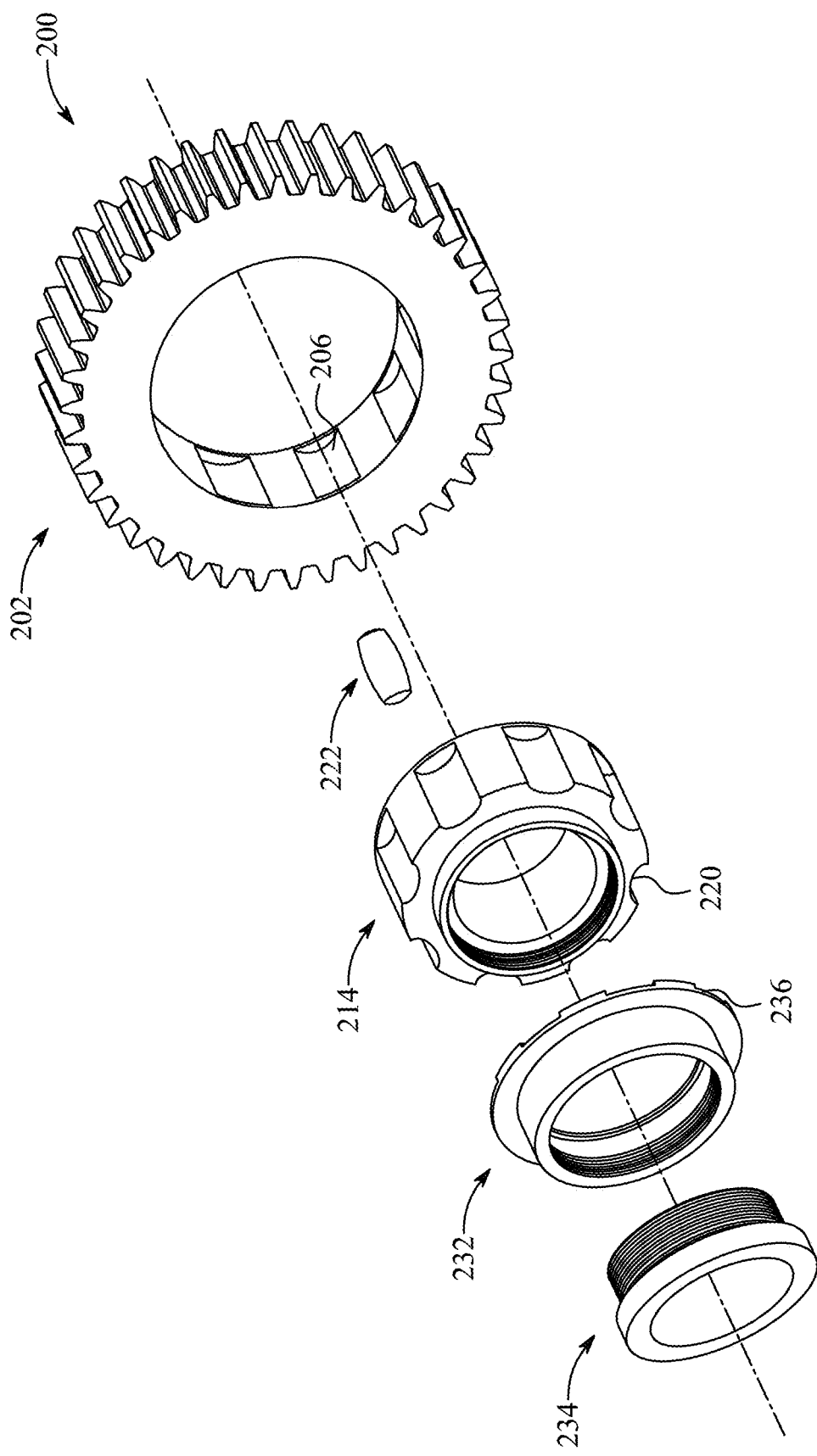
FIG. 18 is an exemplary exploded diagram showing a complete assembly of the self-aligning gear as per the second design aspect, according to certain embodiments.

FIG. 18 illustrates an exploded view of the complete assembly of the self-aligning gear 200, according to the second design aspect. This view shows the spatial relationship between all the major components: the toothed ring gear 202, the spline gear 214, the curved-faces pin assembly 222, the flanged hub 232, and the threaded disc 234, defining the order of assembly and how each component fits together to create the final self-aligning gear 200. Herein, as shown, the toothed ring gear 202 is the outermost component, ready to receive the spline gear 214. The curved-faces pin assemblies 222 are positioned to be inserted into the inner grooves 206 of the toothed ring gear 202 and the spline grooves 220 of the spline gear 214. The flanged hub 232 is aligned to abut the spline gear 214, and the threaded disc 234 is positioned to engage with the internal threads of both the spline gear 214 and the toothed ring gear 202. This exploded view provides the key difference of the second design aspect vis-à-vis the first design aspect, highlighting the cylindrical curved-faces pin assemblies 222 designed to interact with the semicylindrical grooves.

Figure 19:
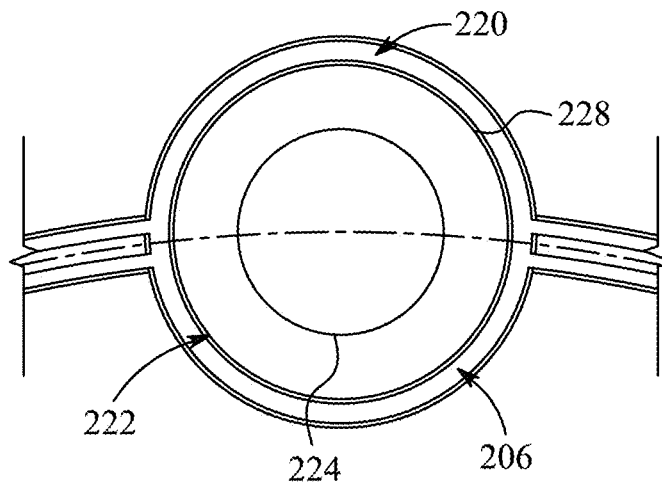
FIG. 19 is an exemplary diagram showing a detailed view of the cylindrical curved-faces pin assembly in assembled form as per the second design aspect, according to certain embodiments.

FIG. 19 illustrates a detailed view of the curved-faces pin assembly 222, according to the second design aspect. This detailed view shows the cylindrical pin 224 encased within the layer of elastomeric material 228. This figure emphasizes the configuration of the curved-faces pin assembly 222 in the second design aspect, where the elastomeric material 228 completely surrounds the cylindrical pin 224. This encapsulation provides a uniform cushioning and damping effect around the entire circumference of the pin 224. The close fit between the elastomeric material 228 and the cylindrical pin 224 ensures that there is no unwanted play or movement within the assembly. This design contributes to the self-aligning capability by allowing the pin 224 to roll and tilt slightly within the semicylindrical grooves (not shown in this figure), accommodating misalignments.

Figure 20:
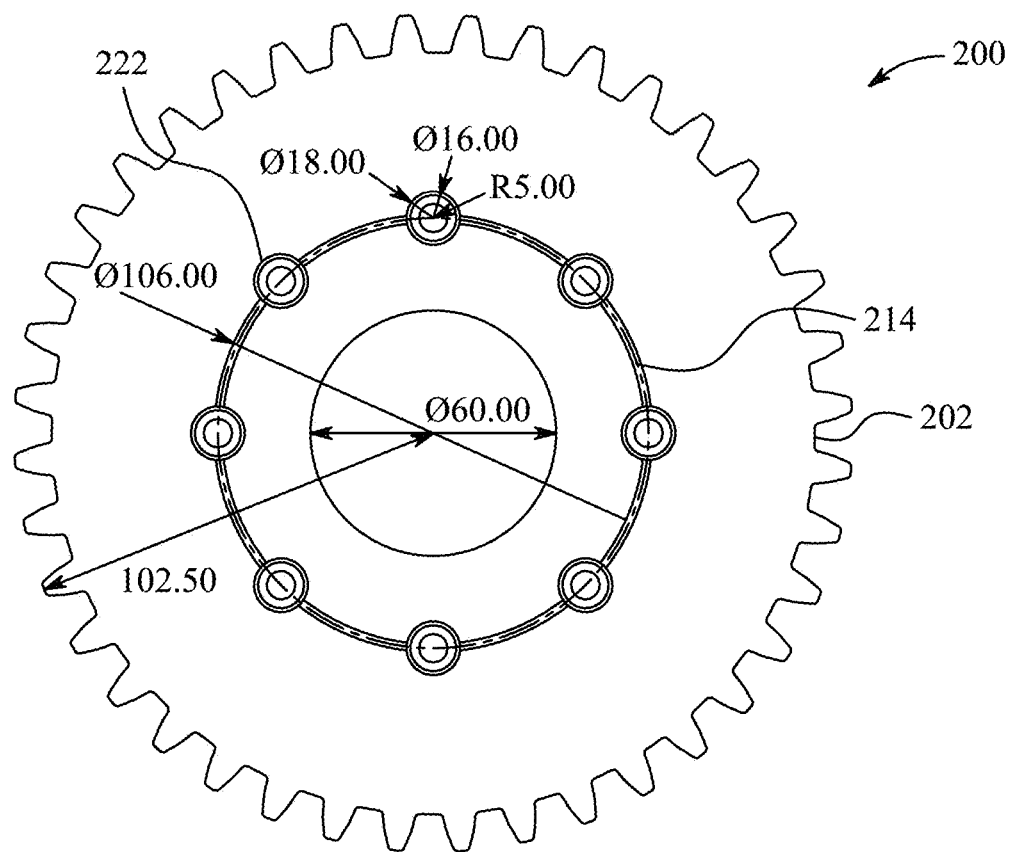
FIG. 20 is an exemplary diagram showing a front view with dimensions of the self-aligning gear as per the second design aspect, according to certain embodiments.

FIG. 20 illustrates a front view of the assembled self-aligning gear 200, according to the second design aspect. This view shows the toothed ring gear 202, the spline gear 214 (represented by its outer circumference and central opening), and the locations of the curved-faces pin assemblies 222 (represented by circles). This assembled view provides a clear representation of the final configuration of the self-aligning gear 200, with all components in their operational positions. The relative positions of the toothed ring gear 202 and the spline gear 214 are evident, and the arrangement of the curved-faces pin assemblies 222, with their cylindrical pins 224, can be inferred.

In the self-aligning gear 200, according to the second design aspect, a filler material 250 may be included. The cylindrical pin 224 of the curved faces pin assembly 222 is centrally located within the semicylindrical walls of each of the plurality of inner grooves 206 and each of the plurality of spline grooves 220. The filler material 250 is configured to fill a gap between the curved faces pin assembly 222 and the semicylindrical walls. The filler material 250 provides additional support and damping within the groove, enhancing the overall performance of the self-aligning gear 200. This filler material 250 occupies the space between the outer surface of the layer of the elastomeric material 228 (which surrounds the cylindrical pin 224) and the semicylindrical walls of the grooves 206, 220. The presence of the filler material 250 ensures that the curved-faces pin assembly 222 is fully supported and prevents any unwanted radial or lateral movement within the groove, contributing to the stability and precision of the gear system. The filler material 250, by filling the gap, also helps to distribute loads more evenly across the interface between the curved-faces pin assembly 222 and the groove walls, reducing stress concentrations. The filler material 250 may be any one of mono cast nylon and polyacetyl plastic. Alternatively, curved faces pin assembly may be placed in the inner grooves 206 without a filler material 250 to allow each pin to move within its respective groove.

In present configuration, the filler material 250 has a Young's modulus less than or equal to 5 M Pa. This low Young's modulus indicates that the filler material 250 is relatively soft and compliant, allowing it to deform easily under load. This compliance is crucial for the self-aligning function, as it allows the filler material 250 to accommodate small movements and vibrations without transmitting excessive forces to the other components. The low stiffness of the filler material 250 ensures that it does not interfere with the rolling and tilting motion of the cylindrical pin 224 within the semicylindrical groove. This contributes to the overall flexibility and misalignment compensation capability of the self-aligning gear 200. The specific choice of filler material 250 with this low Young's modulus is a deliberate design decision to optimize the damping and self-aligning characteristics.

In both design aspects of the self-aligning gear 100 and 200, the elastomeric material 128, 228 is rated for high temperature and pressure resistance. This rating ensures that the elastomeric material can withstand the demanding operating conditions typically encountered in gear systems, where high temperatures and pressures can be generated due to friction and load. The high temperature and pressure resistance ensures that the elastomeric material 128, 228 maintains its mechanical properties and does not degrade or lose its elasticity over time, even under extreme conditions. This rating ensures the long-term reliability and performance of the self-aligning gear 100, 200. The specific material selection for the elastomeric material 128, 228 is based on its ability to meet these demanding requirements.

The elastomeric material 128, 228 of the pattern, in both design aspects, has a Young's modulus in a range of about 5 M Pa to about 8 M Pa. This range of Young's modulus represents a carefully chosen balance between stiffness and compliance. The material is stiff enough to provide adequate support and transmit torque effectively, but it is also compliant enough to allow for the necessary tilting and damping that are central to the self-aligning function. This range provides the desired combination of load-bearing capacity and flexibility, allowing the gear to accommodate misalignments without excessive stress or wear. The specific value of the Young's modulus within this range can be tailored to the specific application requirements.

The cylindrical pin 124, 224, in both design aspects, is of an elastomeric material which has a Young's modulus in a range of about 50 M Pa to about 200 M Pa, preferably about 80 M Pa to about 180 M Pa, about 100 M Pa to about 170 M Pa, about 110 M Pa to about 165 M Pa. The elastomeric material may have a Young's modulus of about 110 MPa or about 162 MPa. The elastomeric material has a Shore A hardness of 20-90, 30-80, 40-70 or 50-60, preferably about 75. Preferably the elastomeric material is a hard elastomer having a Shore D value in the range 30-100, 40-90, 50-80 or 60-70. The elastomer may be a thermoset material or more preferably or a thermoplastic such as a thermoplastic urethane. The thermoset elastomer may be one or more of an epoxy resin, a phenolic resin, a urea-formaldehyde, a melamine, a polyurethane, a polyester, and a silicone. The thermoplastic elastomer may be one or more of polyethylene, polypropylene, polyvinyl chloride, acrylic, polycarbonate, monocast nylon and polyacetyl plastic having a higher Young's modulus, compared to the surrounding elastomeric material 128, 228 and the filler material 250 (in the second design aspect), indicates that the cylindrical pin 124, 224 is relatively more rigid. This increased rigidity of the cylindrical pin 124, 224 is important for providing a solid core within the curved-faces pin assembly 122, 222, enabling it to effectively transmit torque and maintain the overall structural integrity of the assembly. The higher stiffness of the cylindrical pin 124, 224 ensures efficient power transmission and prevents excessive deformation under load.

Thermoset polyurethanes are particularly preferred. Thermoset polyurethanes having a Shore D value of 60-85 or 70-75 are especially preferred. Thermoset polyurethanes are advantageous because they can be cast as curable room temperature liquids on surfaces, in indentations and in cavities of parts made from other materials to thereby provide an elastomeric or semi-elastomeric surface to an otherwise inelastic or hard part or substrate.

Referring now to FIG. 21, illustrated is a method (as represented by reference numeral 300) of correcting misalignment between a gear tooth and a corresponding groove of a self-aligning gear assembly. Various variants described above, with respect to the aforementioned self-aligning gear 100, 200 apply mutatis mutandis to the present method 300.

The method 300 includes installing the curved-faces pin assembly 122, 222 within the corresponding groove 106, 120, 206, 220. The curved-faces pin assembly 122, 222 includes the cylindrical pin 124, 224 having semicircular ends 126 and a pattern of an elastomeric material 128, 228 which conforms to a shape of the groove 106, 120, 206, 220. The installation process involves inserting the curved-faces pin assembly 122, 222 into the appropriate groove, ensuring that the elastomeric material 128, 228 is properly seated and makes full contact with the walls of the groove. This precise installation establishes the desired damping and self-aligning characteristics of the gear assembly. The method 300 ensures that the curved-faces pin assembly 122, 222 is correctly positioned to effectively accommodate misalignments and absorb vibrations during operation.

The method 300 further includes installing the spline gear 114, 214 within a central opening of the toothed ring gear 102, 202. Herein, the toothed ring gear 102, 202 includes the plurality of inner gear teeth 104, 204 alternating with the plurality of inner grooves 106, 206 on the inner circumference 108, 208 and the plurality of outer gear teeth 110, 210 located on the outer circumference 112, 212. The spline gear 114, 214 has the outer circumference 116, 216 including the plurality of spline teeth 118, 218 alternating with the plurality of spline grooves 120, 220. The spline teeth 118, 218 are configured to fit in the inner grooves 106, 206 of the toothed ring gear 102, 202 when the spline gear 114, 214 is assembled to the toothed ring gear 102, 202. This installation step involves carefully aligning the spline gear 114, 214 with the toothed ring gear 102, 202 and then inserting the spline gear 114, 214 into the central opening of the toothed ring gear 102, 202. The spline teeth 118, 218 may be precisely engaged with the corresponding inner grooves 106, 206 to ensure correct operation and prevent any unwanted movement or slippage. This step establishes the primary connection between the two main gear components.

The method 300 also includes locking, with the locking assembly, the spline gear 114, 214 to the toothed ring gear 102, 202. The locking assembly includes the flanged hub 132, 232 and the threaded disc 134, 234. The flange 136, 236 of the flanged hub 132, 232 is configured to face the spline gear 114, 214 and the toothed ring gear 102, 202, and the threaded disc 134, 234 is configured to engage with inner threads of the spline gear 114, 214 and inner threads of the toothed ring gear 102, 202. This locking step secures the spline gear 114, 214 and the toothed ring gear 102, 202 together, preventing any axial movement between them and ensuring that the assembly remains intact and functional during operation. The threaded disc 134, 234 is typically tightened to a specified torque value to provide the necessary clamping force, creating a reliable connection. This locking action completes the assembly of the self-aligning gear 100, 200, making it ready for use.

In the method 300, when applied to the first design aspect (i.e., the self-aligning gear 100), each of the plurality of inner grooves 106 and each of the plurality of spline grooves 120 has the trapezoidal walls. A length of the base of each trapezoidal wall is less than a length of a top surface of the trapezoidal wall. The method 300 further includes centrally locating the curved faces pin assembly 122 between the trapezoidal walls and parallel to the central opening 123 in the spline gear 114 configured to receive a shaft (not shown). The semicircular ends 126 are configured to press fit into the layer of elastomeric material 128. This central positioning of the curved-faces pin assembly 122 within the trapezoidal grooves 106, 120 facilitates its proper function. The press-fit engagement between the semicircular ends 126 and the elastomeric material 128 ensures a secure connection and contributes to the damping characteristics.

Alternatively, for the second design aspect (i.e., the self-aligning gear 200), each of the plurality of inner grooves 206 and each of the plurality of spline grooves 220 has semicylindrical walls. A length of the cylindrical pin 224 of the curved-faces assembly 222 is equal to a length of each of the inner grooves 206 and a length of each of the spline grooves 220, measured along an axis from a back side of the spline gear 214 to a front side of the spline gear 214 and parallel to the central opening 223 in the spline gear 214. The central opening 223 is configured to receive a shaft (not shown). This equal length ensures full engagement and support of the cylindrical pin 224 along the entire length of the semicylindrical grooves 206, 220. This configuration contributes to the stability and load-bearing capacity of the self-aligning gear 200. The method 300, in this case, involves ensuring the proper alignment and insertion of the cylindrical pin 224 within the semicylindrical grooves 206, 220.

The self-aligning gear 100, 200 and method 300 of the present disclosure address the issue of misalignment in power transmission systems. The curved-faces pin assembly 122, 222, with its cylindrical pin 124, 224 having semicircular ends 126 and a pattern of elastomeric material 128, 228 conforming to the shape of the spline grooves 120, 220 and inner grooves 106, 206, provides a mechanism for controlled compliance. This controlled compliance, facilitated by the interaction between the spline teeth 118, 218 and the inner grooves 106, 206, as well as the locking assembly, allows the self-aligning gear 100, 200 to accommodate angular misalignments while maintaining efficient torque transfer. The ability to compensate for misalignment while simultaneously restricting unwanted radial and axial movement is a key distinguishing feature of the self-aligning gear 100, 200. The configuration of the spline teeth 118, 218 to fit in the inner grooves 106, 206, along with the specific geometry of the grooves (i.e., the trapezoidal walls in the first design aspect and the semicylindrical walls in the second design aspect), further contributes to this functionality.

Conventional gear systems typically rely on precise manufacturing and assembly to minimize misalignment, which is often difficult and costly to achieve and maintain in real-world applications. In contrast, the self-aligning gear 100, 200, through the action of the curved-faces pin assembly 122, 222 and the interaction between the spline teeth 118, 218 and the inner grooves 106, 206, actively compensates for misalignment. This compensation is achieved without compromising the ability of the self-aligning gear 100, 200 to transmit torque efficiently. The use of the elastomeric material 128, 228, rated for high temperature and pressure resistance, and having a defined Young's modulus, provides damping capabilities that are not typically found in conventional rigid gear systems. This damping reduces vibration and impact forces, leading to smoother operation and reduced wear on components. Furthermore, the locking assembly, with its flanged hub 132, 232 and threaded disc 134, 234, ensures a secure connection between the toothed ring gear 102, 202 and the spline gear 114, 214, preventing axial movement while still allowing for the necessary tilting motion facilitated by the curved-faces pin assembly 122, 222.

The specific design of the self-aligning gear 100, 200, whether employing the trapezoidal walls (as in the first design aspect) or the semicylindrical walls (as in the second design aspect) for the inner grooves 106, 206 and the spline grooves 120, 220, provides a tailored approach to misalignment compensation. The presence of the filler material 250 in the second design aspect, with its low Young's modulus, further enhances the damping and self-aligning capabilities. These design features, combined with the method 300 of installing the curved-faces pin assembly 122, 222, installing the spline gear 114, 214, and locking the components with the locking assembly, result in a gear system that is more reliable and less susceptible to the detrimental effects of misalignment than conventional gear systems. This leads to the self-aligning gear 100, 200 extending its operational lifespan and reducing its maintenance requirements.

A first embodiment describes a self-aligning gear 100, 200, comprising: a toothed ring gear 102, 202 having a plurality of inner gear teeth 104, 204 alternating with a plurality of inner grooves 106, 206 on an inner circumference 108, 208 and a plurality of outer gear teeth 110, 210 located on an outer circumference 112, 212; a spline gear 114, 214 having an outer circumference 116, 216 comprising a plurality of spline teeth 118, 218 alternating with a plurality of spline grooves 120, 220, wherein the spline teeth 118, 218 are configured to fit in the inner grooves 106, 206 of the toothed ring gear 102, 202 when the spline gear 114, 214 is assembled to the toothed ring gear 102, 202; and a curved-faces pin assembly 122, 222 which includes a cylindrical pin 124, 224 having semicircular ends 126 and a pattern of an elastomeric material 128, 228 which conforms to a shape of the spline grooves 120, 220 and the inner grooves 106, 206.

In an aspect, the self-aligning gear 100, 200 of claim 1, further comprises: a locking assembly configured to lock the spline gear 114, 214 to the toothed ring gear 102, 202, wherein the locking assembly includes a flanged hub 132, 232 and a threaded disc 134, 234, wherein the flange 136, 236 of the hub 132, 232 is configured to face the spline gear 114, 214 and toothed ring gear 102, 202 and the threaded disc 134, 234 is configured to engage with a set of inner threads of the spline gear 114, 214 and a set of inner threads of the toothed ring gear 102, 202.

In an aspect, the self-aligning gear 100, 200 further comprises: a central opening 123, 223 in the spline gear 114, 214, wherein the central opening 123, 223 is configured to receive a shaft 101, 201.

In an aspect, each of the plurality of inner grooves 106 and each of the plurality of spline grooves 120 has trapezoidal walls, wherein a length of a base of each trapezoidal wall is less than a length of a top surface of the trapezoidal wall.

In an aspect, the length of the top surface of each trapezoidal wall is about 2 mm larger than a length of the base.

In an aspect, the pattern comprises a layer of the elastomeric material 128 which covers the trapezoidal walls and base.

In an aspect, the layer of the elastomeric material 128 has a depth of about 3 mm.

In an aspect, the cylindrical pin 124 of the curved faces pin assembly 122 is centrally located between the trapezoidal walls and parallel to the shaft 101, 201, wherein the semicircular ends 126 are configured to press fit into the layer of elastomeric material 128.

In an aspect, each of the plurality of inner grooves 206 and each of the plurality of spline grooves 220 has semicylindrical walls, wherein a length of the cylindrical pin 224 of each curved-faces assembly 222 is equal to a length of each of the inner grooves 206 and a length of each of the spline grooves 220 measured along an axis from a back side of the spline gear 214 to a front side of the spline gear 214 and parallel to the shaft 101, 201.

In an aspect, the pattern comprises a layer of the elastomeric material 228 which surrounds the cylindrical pin 224.

In an aspect, the layer of the elastomeric material 228 has a depth of about 3 mm.

In an aspect, the self-aligning gear 200 further comprises: a filler material 250, wherein the cylindrical pin 224 of the curved faces pin assembly 222 is centrally located within the semicylindrical walls of each of the plurality of inner grooves 206 and each of the plurality of spline grooves 220 and the filler material 250 is configured to fill a gap between the curved faces pin assembly 222 and the semicylindrical walls.

In an aspect, the filler material 250 has a Young's modulus less than or equal to 5 M Pa.

In an aspect, the elastomeric material 128, 228 is rated for high temperature and pressure resistance.

In an aspect, the elastomeric material 128, 228 has a Young's modulus in a range of 5 M Pa to 8 M Pa.

In an aspect, the cylindrical pin 124, 224 is formed of an elastomeric material which has a Young's modulus in a range of about 50 M Pa to about 200 M Pa, a Shore A hardness in a range of about 20 to about 90, and a Shore D value in a range of about 30 to about 100.

A second embodiment describes a method 300 of correcting misalignment between a gear tooth and a corresponding groove of a self-aligning gear assembly, comprising: installing a curved-faces pin assembly 122, 222 within the corresponding groove 106, 120, 206, 220, wherein the curved-faces pin assembly 122, 222 includes a cylindrical pin 124, 224 having semicircular ends 126 and a pattern of an elastomeric material 128, 228 which conforms to a shape of the groove 106, 120, 206, 220.

In an aspect, the method 300 further comprises: installing 304 a spline gear 114, 214 within a central opening of a toothed ring gear 102, 202, wherein the toothed ring gear 102, 202 includes a plurality of inner gear teeth 104, 204 alternating with a plurality of inner grooves 106, 206 on an inner circumference 108, 208 and a plurality of outer gear teeth 110, 210 located on an outer circumference 112, 212, wherein the spline gear 114, 214 has an outer circumference 116, 216 comprising a plurality of spline teeth 118, 218 alternating with a plurality of spline grooves 120, 220, wherein the spline teeth 118, 218 are configured to fit in the inner grooves 106, 206 of the toothed ring gear 102, 202 when the spline gear 114, 214 is assembled to the toothed ring gear 102, 202; and locking 306, with a locking assembly, the spline gear 114, 214 to the toothed ring gear 102, 202, wherein the locking assembly includes a flanged hub 132, 232 and a threaded disc 134, 234, wherein the flange 136, 236 of the hub 132, 232 is configured to face the spline gear 114, 214 and the toothed ring gear 102, 202, and the threaded disc 134, 234 is configured to engage with inner threads of the spline gear 114, 214 and inner threads of the toothed ring gear 102, 202.

In an aspect, the method 300, wherein each of the plurality of inner grooves 106 and each of the plurality of spline grooves 120 has trapezoidal walls, wherein a length of a base of each trapezoidal wall is less than a length of a top surface of the trapezoidal wall, further comprises centrally locating the curved faces pin assembly 122 between the trapezoidal walls and parallel to a central opening 123 in the spline gear 114 configured to receive a shaft 101, 201, wherein the semicircular ends 126 are configured to press fit into the layer of elastomeric material 128.

In an aspect, each of the plurality of inner grooves 206 and each of the plurality of spline grooves 220 has semicylindrical walls, wherein a length of the cylindrical pin 224 of each curved-faces assembly 222 is equal to a length of each of the inner grooves 206 and a length of each of the spline grooves 220 measured along an axis from a back side of the spline gear 214 to a front side of the spline gear 214 and parallel to a central opening 223 in the spline gear 214, wherein the central opening 223 is configured to receive a shaft 101, 201.

Numerous modifications and variations of the present disclosure are possible in light of the above teachings. It is therefore to be understood that within the scope of the appended claims, the invention may be practiced otherwise than as specifically described herein.

The invention claimed is:

1. An elastomerically damped gear, comprising:
   a toothed ring gear having a plurality of inner gear teeth alternating with a plurality of inner grooves on an inner circumference and a plurality of outer gear teeth located on an outer circumference;
   a spline gear having an outer circumference comprising a plurality of spline teeth alternating with a plurality of spline grooves, wherein the spline teeth are configured to fit in the inner grooves of the toothed ring gear when the spline gear is assembled to the toothed ring gear;
   wherein each of the plurality of inner grooves and each of the plurality of spline grooves has trapezoidal walls, wherein a length of a base of each trapezoidal wall is less than a length of a top surface of the trapezoidal wall; and
   a curved-faces pin assembly which includes a cylindrical pin having semicircular ends and a pattern of an elastomeric material which conforms to a shape of the spline grooves and the inner grooves wherein the pattern is a layer of the elastomeric material covering the trapezoidal walls and base.

2. The elastomerically damped gear of claim 1, further comprising:
   a locking assembly configured to lock the spline gear to the toothed ring gear, wherein the locking assembly includes a flanged hub and a threaded disc, wherein the flange of the hub is configured to face the spline gear and the toothed ring gear and the threaded disc is configured to engage with a set of inner threads of the spline gear and a set of inner threads of the toothed ring gear.

3. The elastomerically damped gear of claim 1, further comprising:
a central opening in the spline gear, wherein the central opening is configured to receive a shaft.

4. The elastomerically damped gear of claim 1, wherein the length of the top surface of each trapezoidal wall is about 2 mm larger than a length of the base.

5. The elastomerically damped gear of claim 1, wherein the layer of the elastomeric material has a depth of about 3 mm.

6. The elastomerically damped gear of claim 1, wherein the cylindrical pin of the curved faces pin assembly is centrally located between the trapezoidal walls and parallel to the shaft, wherein the semicircular ends are configured to press fit into the layer of elastomeric material.

7. The elastomerically damped gear of claim 1, wherein a length of the cylindrical pin of each curved-faces assembly is equal to a length of each of the inner grooves and a length of each of the spline grooves measured along an axis from a back side of the spline gear to a front side of the spline gear and parallel to the shaft.

8. The elastomerically damped gear of claim 7, wherein the pattern comprises a layer of the elastomeric material which surrounds the cylindrical pin.

9. The elastomerically damped gear of claim 8, further comprising:
a filler material, wherein the cylindrical pin of the curved faces pin assembly is centrally located within the semicylindrical walls of each of the plurality of inner grooves and each of the plurality of spline grooves and the filler material is configured to fill a gap between the curved faces pin assembly and the semicylindrical walls.

10. The elastomerically damped gear of claim 9, wherein the filler material has a Young's modulus less than or equal to 5 MPa.

11. The elastomerically damped gear of claim 1, wherein the elastomeric material has a Young's modulus in a range of about 5 MPa to about 8 MPa.

12. The elastomerically damped gear of claim 1, wherein the cylindrical pin is formed of an elastomeric material which has a Young's modulus in a range of about 50 MPa to about 200 MPa, a Shore A hardness in a range of about 20 to about 90, and a Shore D value in a range of about 30 to about 100.

* * * * *